United States Patent
Moghaddam et al.

(10) Patent No.: US 12,412,128 B1
(45) Date of Patent: Sep. 9, 2025

(54) SYSTEMS AND METHODS FOR GENERATING SYNTHETIC DATA USING COMPUTER-SIMULATED PERSONAS AND MACHINE LEARNING-BASED PERSONA SELECTION

(71) Applicant: Socialtrait Inc., Mount Waverley (AU)

(72) Inventors: Mohammad Mahdi Kazemi Moghaddam, Sydney (AU); Lukas Judith, Sydney (AU); Sachit Shanbhag, Maharashtra (IN); Suraj Narayanan Sasikumar, Sydney (AU)

(73) Assignee: Socialtrait Inc., Mount Waverley (AU)

( * ) Notice: Subject to any disclaimer, the term of this patent is extended or adjusted under 35 U.S.C. 154(b) by 0 days.

(21) Appl. No.: 19/076,286

(22) Filed: Mar. 11, 2025

Related U.S. Application Data

(60) Provisional application No. 63/768,112, filed on Mar. 6, 2025, provisional application No. 63/736,746, filed on Dec. 20, 2024, provisional application No. 63/563,948, filed on Mar. 11, 2024.

(51) Int. Cl.
*G06N 20/00* (2019.01)

(52) U.S. Cl.
CPC .................. *G06N 20/00* (2019.01)

(58) Field of Classification Search
CPC ............... G06N 20/00; G06F 40/35
See application file for complete search history.

(56) References Cited

U.S. PATENT DOCUMENTS

| | | | |
|---|---|---|---|
| 11,657,797 B2* | 5/2023 | Vishnoi | G06N 5/043 704/260 |
| 2022/0021630 A1* | 1/2022 | Goyal | G06N 3/08 |

* cited by examiner

*Primary Examiner* — Hau H Hoang
(74) *Attorney, Agent, or Firm* — Padowithz Alce; Alce PLLC

(57) ABSTRACT

A method for generating automated discourse data using computer-generated synthetic personas is disclosed. The method is implemented at a synthetic discourse data service executing as an API-based application within a distributed network of computers. The method includes receiving discourse input data via an API endpoint from a client device, generating an embedding vector representation of the discourse input data using a GPU-accelerated embedding generation model, and identifying candidate computer-simulated personas from a vector database. A subset of personas is dynamically selected based on a computed persona relevance score derived from vector distance calculations. A discourse activation value is computed for each selected persona, determining its engagement in a simulated discourse session. A batch processing framework instantiates an engagement subset of personas, which participate in a computer-simulated discourse session, generating synthetic discourse data stored in memory. The synthetic discourse data is selectively transmitted to a client device via an API response.

20 Claims, 18 Drawing Sheets

200

```
Configuring an Automated Discourse with one or
more Virtual Agents S210
```

```
Identifying one or more Candidate Virtual Agents
S220
```

```
Selecting one or more Responding Virtual Agents
based on the one or more Candidate Virtual Agents
S230
```

```
Surfacing one or more Responses from the one or
more Responding Virtual Agents S240
```

FIG. 2

SYSTEMS AND METHODS FOR GENERATING SYNTHETIC DATA USING COMPUTER-SIMULATED PERSONAS AND MACHINE LEARNING-BASED PERSONA SELECTION

CROSS-REFERENCE TO RELATED APPLICATIONS

This application claims the benefit of U.S. Provisional Application No. 63/736,746 filed on 20 Dec. 2024, U.S. Provisional Application No. 63/563,948 filed on 11 Mar. 2024, and U.S. Provisional Application No. 63/768,112, filed on 6 Mar. 2025, which are incorporated in their entireties by this reference.

TECHNICAL FIELD

The inventions herein relate generally to the machine learning-based data research and analysis fields, and more specifically to a new and useful system and method for endowing virtual agents with decision-making proficiency using machine learning in the machine learning-based data research and analysis field.

BACKGROUND

Contemporary socioeconomic and market analysis and research technologies employ various methodologies for collecting and sourcing data from populations to gain insights into individual behavior and preferences. These approaches frequently involve techniques such as focus groups, surveys, individual observation, and other methods that are often time-consuming and costly. Furthermore, it is often difficult to capture the vast diversity of individual experiences and perspectives, limiting the development of accurate and nuanced understandings of individual behavior in multifaceted communities.

Therefore, there is a need in the machine learning-based data research and analysis field to create improved systems and methods for implementing machine learning-based generation of interactive virtual persona communities. The embodiments of the present application described herein provide technical solutions that address, at least, the needs described above, as well as deficiencies of the state of the art.

BRIEF SUMMARY OF THE EMBODIMENT(S)

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

In some embodiments, a computer-implemented method for generating automated discourse data using computer-generated synthetic personas is disclosed. The method is implemented at a synthetic discourse data service (discourse service) executed at least in part by an API-based application running on a distributed network of computers. The method includes receiving discourse input data via an API endpoint from a client device, generating an embedding vector representation of the discourse input data using a GPU-accelerated embedding generation model, and identifying candidate computer-simulated personas by retrieving persona data from a vector database. A subset of personas is selected in real-time based on computing persona relevance by determining vector distances between the embedding vector representation of the discourse input data and persona embedding representations. Personas meeting a predefined selection threshold are dynamically instantiated. The system further computes a discourse activation value for each selected persona, indicating the persona's interest in engaging in a virtual discourse session. A batch processing framework is employed to instantiate an engagement subset of personas, which then participate in a simulated discourse session, generating a corpus of synthetic discourse data stored in memory. The system transmits a portion of the synthetic discourse data to a client device via an API response based on a user-selected request.

In some embodiments, generating the corpus of synthetic discourse data includes executing a transformer-based language model running in an asynchronous inference service. A discourse data generation module processes the discourse input data and historical discourse data using a fine-tuned transformer model that adapts to persona attributes, ensuring that generated discourse data remains coherent with prior discourse interactions.

In some embodiments, executing the computer simulation environment includes running a reinforcement learning-driven discourse generation model, where a persona behavior policy optimization dynamically updates discourse activation values based on historical discourse engagement metrics. The reinforcement learning model ensures adaptive persona engagement, improving the consistency and contextual relevance of generated synthetic discourse.

In some embodiments, the discourse input data is processed to extract contextual information, including retrieving historical discourse data from a database based on a client identifier associated with the client device. The extracted historical discourse data is used to generate enriched embedding representations of the discourse input data, capturing semantic and conversational features for improved persona selection and response generation.

In some embodiments, generating embedding representations for discourse input data includes computing a persona embedding vector for each computer-simulated persona based on persona attributes stored within a corresponding persona dataset. The persona embedding vector representation allows the system to match user discourse input with relevant personas based on semantic similarity and behavioral traits.

In some embodiments, executing the API-based application comprises performing batch processing for persona selection and engagement activation, where multiple candidate personas are evaluated simultaneously using a batch inference framework. This approach reduces computational overhead and API latency, improving the efficiency of persona selection and discourse activation.

In some embodiments, computing the discourse activation value for each candidate persona includes generating a confidence score based on normalized log probabilities of a participation decision. The confidence score is used to rank candidate personas dynamically, adjusting their likelihood of being selected for engagement in the simulated discourse session.

In some embodiments, retrieving persona data from a vector database is optimized by implementing a shared key-value (KV) caching mechanism. The caching mechanism stores common persona-query responses and reduces redundant computations across similar persona selection requests, improving system efficiency and response time.

In some embodiments, identifying candidate personas from the persona data repository involves performing a k-nearest neighbors (k-NN) filtering operation. The k-NN operation generates an initial ranked list of personas based on their vector similarity to the discourse input data, prioritizing personas that exceed a predefined similarity threshold for engagement consideration.

In some embodiments, computing the discourse activation value for each candidate persona includes generating an excitement score. The excitement score is derived by combining a persona-specific willingness score, computed based on intrinsic attributes of the persona, with a conversation-based willingness score, which considers historical discourse data. The excitement score modulates persona participation likelihood using an exponential smoothing function.

In some embodiments, the corpus of synthetic discourse data generated during the simulated discourse session is stored in a database implementing approximate nearest neighbor (ANN) indexing for efficient retrieval. The indexed data structure allows prior simulated discourse sessions to inform future persona participation decisions, optimizing long-term engagement models.

In some embodiments, retrieving persona data from the vector database involves performing context-aware truncation of the historical discourse data when the history length exceeds a predefined context window. The system retains recent and semantically relevant discourse data, ensuring that persona selection and response generation remain contextually appropriate.

In some embodiments, executing the computer simulation environment to automate the simulated discourse session involves dynamically adjusting persona participation behavior using a multi-agent reinforcement learning framework. The reinforcement learning model enables each computer-simulated persona to independently learn an optimal engagement policy by iterating over past discourse interactions and reward signals.

In some embodiments, the method is implemented as a microservices-based API application deployed on a cloud computing infrastructure. The distributed computing environment enables scalable persona selection, discourse activation, and synthetic discourse generation, ensuring that the system can handle large-scale discourse simulations efficiently.

In some embodiments, data transmission within the discourse service is optimized using event-driven API response mechanisms. The system leverages WebSocket streaming or RESTful API communication to ensure low-latency data delivery, enabling real-time interaction with the generated synthetic discourse data.

In some embodiments, synthetic discourse data generation is performed using a transformer-based language model running in an asynchronous inference service. The model adapts responses dynamically based on persona attributes and prior discourse interactions, ensuring coherence in multi-turn discourse simulations.

In some embodiments, reinforcement learning-driven persona behavior optimization is implemented within the computer simulation environment. The system dynamically adjusts discourse activation values based on past engagement patterns, improving the naturalness and diversity of persona participation in simulated discourse.

In some embodiments, a system for generating automated discourse data using computer-generated synthetic personas is disclosed. The system comprises a distributed computing network executing an API-based application implementing a synthetic discourse data service. The system includes a communication interface for receiving discourse input data via an API endpoint and transmitting synthetic discourse data to a client device. A GPU-accelerated embedding generation module computes embedding vector representations of the discourse input data, while a persona selection module retrieves and ranks candidate personas from a vector database based on vector similarity calculations. A discourse activation module computes engagement scores for personas, and a batch processing framework dynamically selects and instantiates personas for simulated discourse. A simulated discourse generation module executes discourse simulations and generates synthetic discourse data, which is stored in memory and made available for retrieval and analysis.

In some embodiments, generating the corpus of synthetic discourse data within the system involves a transformer-based language model running in an asynchronous inference service. The discourse generation module ensures coherence in persona interactions using fine-tuned transformer models adapted to specific persona attributes and prior discourse history.

In some embodiments, executing the computer simulation environment within the system includes running a reinforcement learning-driven discourse generation model. The model is implemented using a persona behavior policy optimization algorithm, dynamically adjusting persona engagement values based on historical discourse data, improving discourse flow and engagement patterns.

BRIEF DESCRIPTION OF THE FIGURES

FIG. 2 illustrates an example method 200 in accordance with one or more embodiments of the present application;

DESCRIPTION OF THE PREFERRED EMBODIMENTS

The following description of the preferred embodiments of the present application are not intended to limit the inventions to these preferred embodiments, but rather to enable any person skilled in the art to make and use these inventions.

Figure 1A:
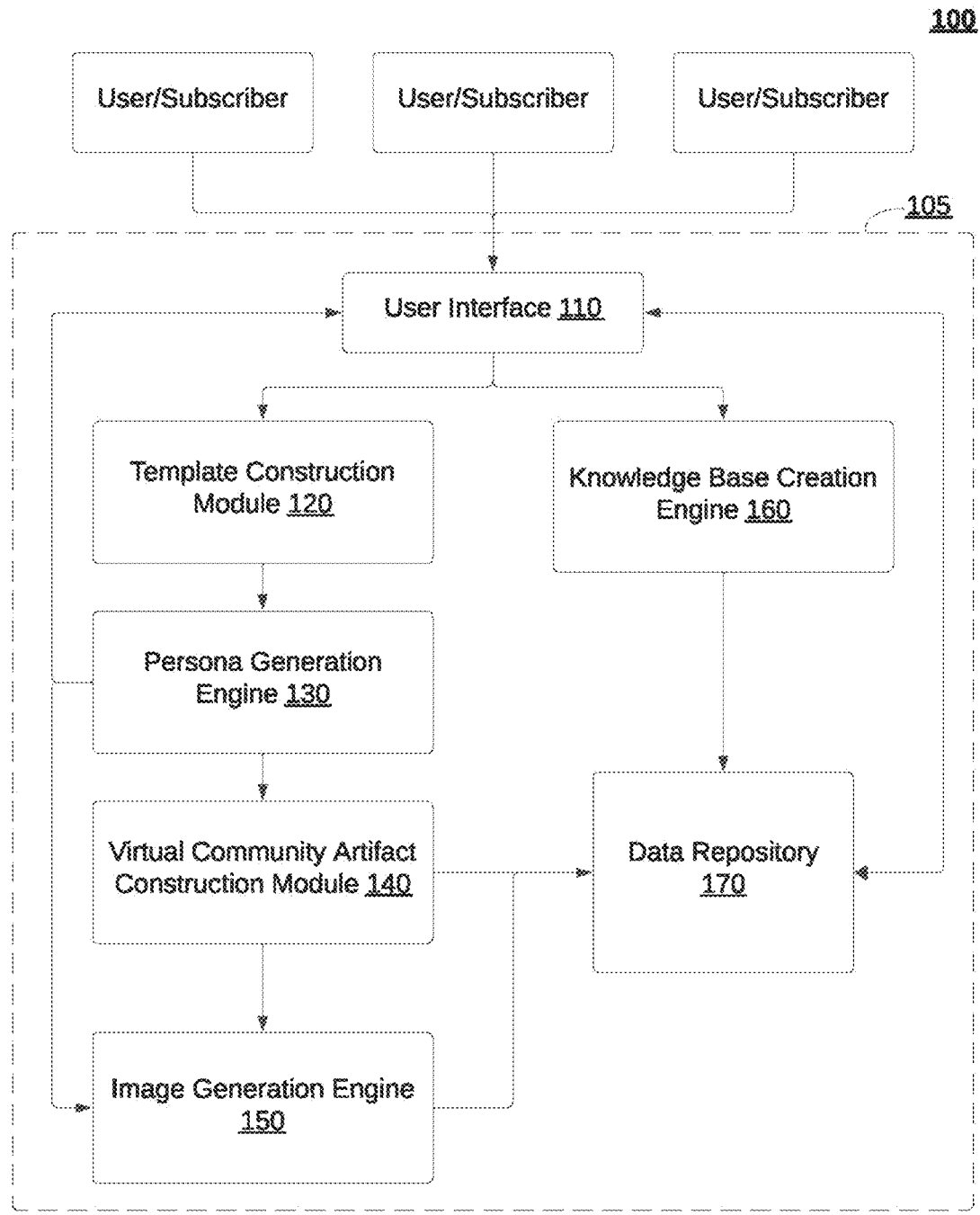
FIGS. 1A and 1B illustrate a schematic representation of a system 100 in accordance with one or more embodiments of the present application.
Figure 1B:
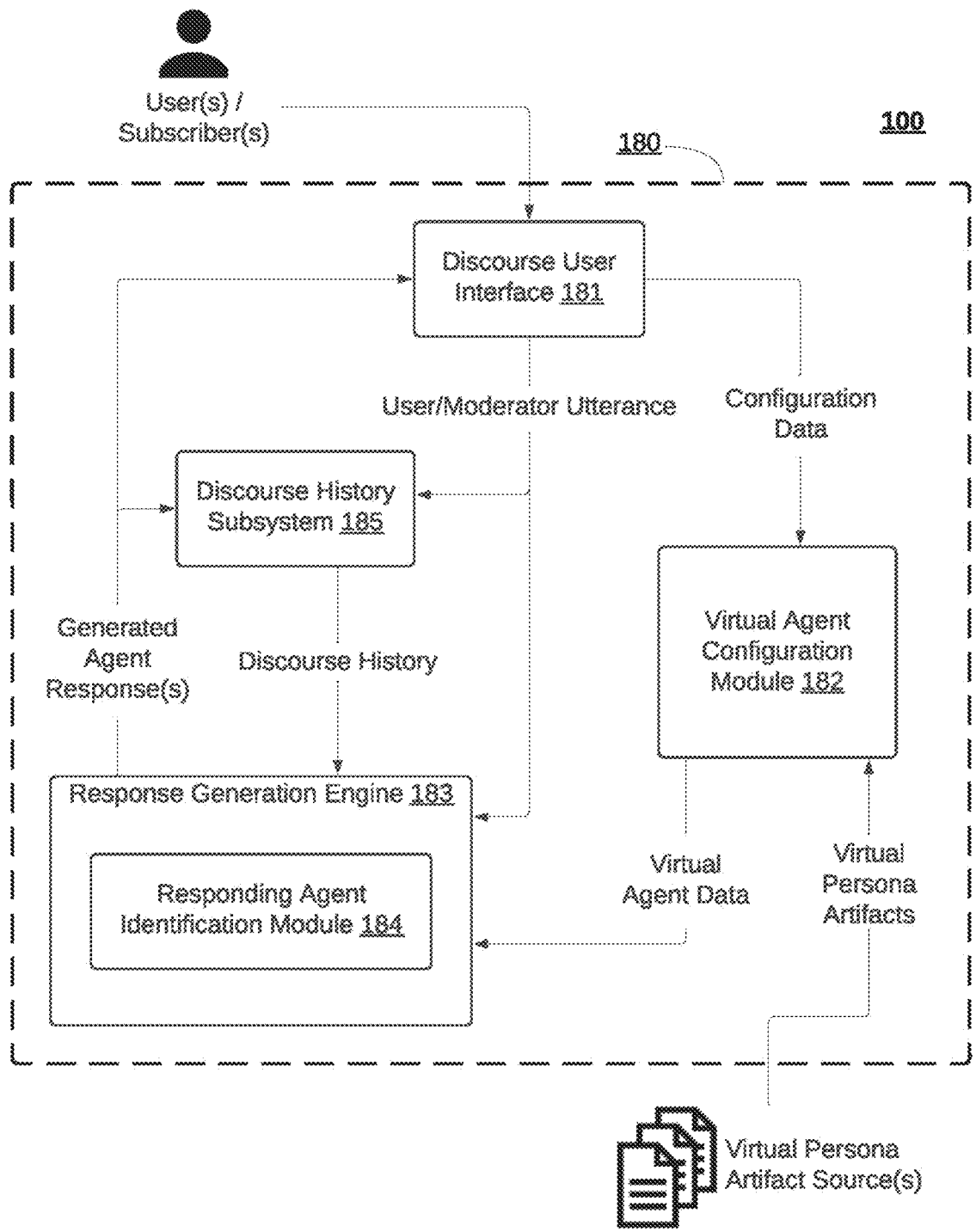

1.00 System for Machine-Learning Based Generation of Virtual Agent Responses in an Automated Discourse As shown in FIGS. 1A-1B, a system 100 for machine-learning based generation of virtual agent responses in an automated discourse may include a virtual persona community generation subsystem 105 and an automated discourse subsystem 180. The virtual persona community generation subsystem 105 may preferably function to generate a community of virtual personas, as described in U.S. Provisional Application No. 63/613,860, which is incorporated in its entirety by this reference. The automated discourse subsystem 180 may preferably function to configure, execute, and manage an automated discourse between one or more users (or subscribers) and one or more virtual agents.

Virtual persona community generation subsystem 105 and automated discourse subsystem 180 may each be configured to perform specific, distinct functions within system 100 and may operate independently of one another or in combination with one another. It shall be noted that while FIGS. 1A-1B illustrate system 100 as including both virtual persona community generation subsystem 105 and automated discourse subsystem 180, other embodiments of system 100 may only include one of subsystem 105 and subsystem 180 (and/or may include other modules not explicitly depicted in FIGS. 1A-1B).

In some examples, the system 100 may be referred to as a synthetic discourse data service (or discourse service) and may be implemented at least in part by an application programming interface (API)-based application executed by a distributed network of computers. The term "API-based application" may refer to a software application that is capable of receiving external inputs (e.g., inputs from a user) based on an API (e.g., a predefined API). In some examples, each of at least a portion of the components of the synthetic discourse data service may be executed by a respective set of computers within a distributed network of computers (e.g., a cloud-based system). Additionally, or alternatively, each of at least a portion of the components of the synthetic discourse data service may be located on a single controller or may be located on any combination of multiple controllers configured to communicate with each other.

In some examples, synthetic discourse data service may be a cloud-based application that is hosted on one or more remote servers accessible via a user interface. In such examples, the user interface may interact with the synthetic discourse data service using one or more network protocols (e.g., a Wireless Fidelity (Wi-Fi) protocol). The synthetic discourse data service may provide the user interface to a user upon establishment of an initial connection with the synthetic discourse data service using the one or more network protocols. Accordingly, it shall be recognized that the modules of the synthetic discourse data service may be executed by the one or more network of computers or servers, which may be specifically programmed or encoded to perform the several operations for identifying responding virtual agents and generating corresponding responses.

1.05 Virtual Persona Community Generation Subsystem

As shown in FIG. 1A, virtual persona community generation subsystem 105 (sometimes referred to herein as community generation subsystem 105) may include a user interface 110, a template construction module 120, a persona generation engine 130, a virtual community artifact construction module 140, an image generation engine 150, a knowledge base creation engine 160, and a data repository 170.

1.10 User Interface

The user interface 110 may preferably function to receive user (or subscriber) input from one or more users or subscribers. In one or more embodiments, the user interface 110 may enable one or more users of community generation subsystem 105 or system 100 to initiate, configure, and/or otherwise manage a generation and interaction with one or more virtual persona communities. Accordingly, user interface 110 may be in operable communication with one or more components of community generation subsystem 105 or system 100 including, but not limited to, template construction module 120, persona generation engine 130, knowledge base creation engine 160, and data repository 170. In various embodiments, user interface 110 may function to send user input data to one or more components of system 100, and/or user interface 110 may function to output or display data from system 100 to one or more users. In some embodiments, user interface 110 may be implemented as a graphical user interface (GUI).

1.20 Template Construction Module

The template construction module 120 may preferably function to construct a virtual community persona template for a target virtual community based on one or more user-input virtual community generation parameters, as described in U.S. Provisional Application No. 63/613,860. In one or more embodiments, template construction module 120 may be operably connected to user interface 110 and may function to receive the user-input virtual community generation parameters from user interface 110. In turn, template construction module 120 may function to construct a virtual community persona template for a target virtual community that may serve as a template for generating one or more virtual personas of the target virtual community. In one or more embodiments, template construction module 120 may additionally function to remediate one or more deficiencies in the user input data by generating one or more deficient or missing virtual community generation parameters.

1.30 Persona Generation Engine

The persona generation engine 130 may preferably function to generate one or more virtual personas of a target virtual community based on an input of a virtual community persona template. In one or more embodiments, persona generation engine 130 may source or receive a virtual community persona template for a target virtual community from template construction module 120 and, in turn, persona generation engine 130 may function to generate a population of N virtual personas for the target virtual community. In one or more embodiments, the persona generation engine 130 may function to generate virtual personas based on persona variable values and distributions defined in the virtual community persona template. In some preferred embodiments, persona generation engine 130 may iteratively generate batches of n personas, where n<N, and may automatically adjust the generation of one or more subsequent batch generation iterations based on empirical and target persona variable distributions, as described in U.S. Provisional Application No. 63/613,860. In some embodiments, persona generation engine 130 may be in operable communication with user interface 110 to surface generated virtual personas, and empirical persona variable distributions in real-time to one or more users. Additionally, in some preferred embodiments, persona generation engine 130 may function to construct one or more persona artifacts that may function as data structures to store respective generated virtual personas.

1.40 Virtual Community Artifact Construction Module

The virtual community artifact construction module 140 may preferably function to construct a virtual community digital artifact for a target virtual persona community based on an input of one or more constructed persona artifacts of the target virtual persona community. In one or more embodiments, virtual community artifact construction module 140 may function to construct a virtual community digital artifact that may function as a data structure to store one or more characteristics, parameters, and/or descriptors of a target virtual persona community. Additionally, in some embodiments, virtual community artifact construction module 140 may function to compute a hash for each constructed persona artifact of the target virtual community, and in turn virtual community artifact construction module 140 may function to embed or include a list of persona artifact hashes in the virtual community digital artifact. In some embodiments, virtual community artifact construction module 140 may be in operable communication with data repository 170. In some such embodiments, virtual community artifact construction module 140 may function to output constructed virtual community artifacts and/or persona artifacts to data repository 170.

1.50 Image Generation Engine

The image generation engine 150 may preferably function to generate one or more images based on an input of generated virtual persona artifacts or generated virtual community digital artifacts. In some embodiments, image generation engine 150 may generate an image that may relate to a likely or plausible appearance or likeness of a virtual persona. Additionally, or alternatively, in some embodiments, image generation engine 150 may function to generate a virtual community image that may relate to a likely or plausible appearance or likeness of an average virtual persona member of the virtual community.

1.60 Knowledge Base Creation Engine

The knowledge base creation engine 160 may preferably function to create one or more n-dimensional and/or multi-modal vector representations of one or more digital assets that may be accessible to and/or otherwise associated with the generated virtual personas of a virtual persona community. In one or more embodiments, knowledge base creation engine 160 may receive one or more digital assets from one or more users via user interface 110, and in turn knowledge base creation engine 160 may function to automatically construct or generate vector representations of the user-specified digital assets. In some preferred embodiments, knowledge base creation engine 160 may construct a knowledge base in data repository 170 to store the vector representation(s) of one or more digital assets, and/or any relevant digital asset metadata such as digital asset identification (ID) values.

In various embodiments, template construction module 120, persona generation engine 130, virtual community artifact construction module 140, image generation engine 150, and/or knowledge base creation engine 160 may implement or otherwise employ one or more machine learning algorithms and/or one or more ensembles of trained machine learning models. In such embodiments, the one or more machine learning algorithms and/or one or more ensembles of trained machine learning models may include one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFIT, XLM UDify, MT-DNN, SpanBERT, ROBERTa, XLNet, ERNIE, KnowBERT, VideoBERT, ERNIE BERT-wwm, MobileBERT, TinyBERT, GPT, GPT-2, GPT-3, GPT-4 (and all subsequent iterations), LLAMA, LLAMA 2 (and subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

1.70 Data Repository

The data repository 170 may preferably function to receive and/or store data collected by and/or generated by community generation subsystem 105 or system 100, including, but not limited to, one or more collected virtual community generation parameters, one or more generated persona artifacts, one or more virtual community digital artifacts, one or more generated persona and/or virtual community images, one or more n-dimensional or multi-modal digital asset vector representations, and/or any other data collected, generated, and/or processed by community generation subsystem 105 or system 100. Additionally, or alternatively, in one or more embodiments data repository 170 may be queried or accessed by one or more components of community generation subsystem 105 or system 100 and/or one or more users (via user interface 110) to enable data retrieval and/or data surfacing to data stored by data repository 170. In various embodiments, data repository 170 may be implemented as and/or in operable communication with one or more external data repositories and/or data repository services (e.g., remote servers, cloud storage, external network storage, and/or the like). In some embodiments, data repository 170 may include or be implemented as a plurality of data repositories 170.

1.8 Automated Discourse Subsystem

As shown in FIG. 1B, automated discourse subsystem 180 may include a discourse user interface 181, a virtual agent configuration module 182, a response generation engine 183, and a discourse history subsystem 185. In various embodiments, automated discourse subsystem 180 may preferably function to configure, execute, and/or manage an automated discourse between one or more users (or subscribers) and one or more virtual agents. Accordingly, automated discourse subsystem 180 may permit one or more users to interact with one or more virtual agents in an automated discourse that may include user utterances/queries directed to the one or more virtual agents and natural language responses of the one or more virtual agents generated by automated discourse subsystem 180.

The discourse user interface 181 may preferably function to receive user (or subscriber) input from one or more users. In one or more embodiments, the user interface 181 may allow one or more users of automated discourse subsystem 180 to initiate, configure, participate in, and/or otherwise manage an automated discourse with one or more virtual agents. In various embodiments, discourse user interface 181 may function to receive user/subscriber input for configuring an automated discourse and/or for configuring one or more virtual agents that may participate in the automated discourse. Additionally, or alternatively, discourse user interface 181 may function to collect and output one or more received user (moderator) utterances to one or more components of automated discourse subsystem 180 and/or system 100. Additionally, or alternatively, discourse user interface 181 may function to surface virtual agent responses to one or more users. Accordingly, user interface 181 may be in operable communication with one or more components of automated discourse subsystem 180 including, but not limited to, virtual agent configuration module 182, response generation engine 183, and discourse history subsystem 185. In some embodiments, discourse user interface 181 may be implemented as a graphical user interface (GUI).

The virtual agent configuration module 182 may preferably function to configure and/or generate one or more virtual agents based on user input configuration data. In some embodiments, the user input configuration data may include one or more instructions, directions, and/or requirements to initiate and/or otherwise manage the generation of one or more virtual agents by virtual agent configuration module 182. In one or more embodiments, virtual agent configuration module 182 may function to source one or more virtual persona artifacts from one or more virtual persona artifact sources, and in turn virtual agent configuration module 182 may function to assign a sourced virtual persona to each configured or generated virtual agent based on the user input configuration data. In some embodiments, virtual agent configuration module 182 may function to source one or more virtual persona artifacts generated and/or stored by virtual persona community generation subsystem 105. It shall be noted that virtual agent configuration module 182 may additionally, or alternatively, source one or more virtual personas from any suitable virtual persona artifact source. In one or more embodiments, each sourced virtual persona artifact may include data relating to one or more persona variables that may define one or more characteristics of a corresponding virtual persona that may in turn be assigned to a constructed virtual agent.

The response generation engine 183 may preferably function to generate one or more virtual responses of one or more virtual agents in the automated discourse. In one or more embodiments, response generation engine 183 may function to receive one or more user/moderator utterances or queries, and in turn response generation engine 183 may function to output distinct virtual agent responses to the one or more user/moderator utterances or queries based on virtual agent data (e.g., virtual persona artifacts of the virtual agents) and/or an automated discourse history comprising previous user utterances and agent responses of the current automated discourse. In some embodiments, response generation engine 183 may implement or employ one or more machine learning models that may function to compute or output virtual agent responses. In various embodiments, response generation engine 183 may be in operable communication with virtual agent configuration module 182 to receive virtual agent data (e.g., virtual persona artifacts, agent identifiers, and/or any other suitable agent data) relating to the one or more virtual agents participating in the automated discourse. In some embodiments, response generation engine 183 may function to retrieve the automated discourse history from discourse history subsystem 185.

In one or more embodiments, response generation engine 183 may include responding agent identification module 184. In such embodiments, responding agent identification module 184 may preferably function to identify a subset of the one or more virtual agents participating in the automated discourse as responding agents that may be likely or suited to respond to the current user/moderator utterance at each distinct timestep in the automated discourse. In some embodiments, responding agent identification module 184 may function to identify the subset of responding agents based on identifying or computing a simulated willingness and/or suitability of each virtual agent to respond to the current user/moderator utterance. In some embodiments, responding agent identification module 184 may additionally or alternatively function to identify the subset of responding agents based on the automated discourse history. In one or more embodiments, responding agent identification module 184 may implement or employ one or more machine learning models that may identify or classify virtual agents as either responding agents or non-responding agents.

The discourse history subsystem 185 may preferably function to construct, modify, and/or store the automated discourse history of the automated discourse. In some embodiments, discourse history subsystem 185 may function to construct an automated discourse history based on an initialization of an automated discourse (e.g., based on receiving an initial user/moderator utterance that may start an automated discourse). In one or more embodiments, discourse history subsystem 185 may function to receive all user-input utterances and all generated virtual agent responses for a distinct automated discourse, and in turn discourse history subsystem 185 may function to append or otherwise add each user utterance and/or agent response to the automated discourse history. In one or more embodiments, once an automated discourse has ended, discourse history subsystem 185 may function to finalize and store the automated discourse history. In some embodiments, discourse history subsystem 185 may include one or more data storage devices or repositories (e.g., flash memory, RAM, SSDs, hard drives, USB storage, local data storage, and/or any other suitable storage device) that may function to store constructed automated discourse history data. Additionally, or alternatively, discourse history subsystem 185 may be in operable communication with one or more remote storage devices or repositories (e.g., remote servers, cloud storage, external network storage, and/or the like) to output and/or retrieve automated discourse history data.

It shall be noted that, in one or more embodiments, components of automated discourse subsystem 180, including virtual agent configuration module 182, response generation engine 183, responding agent identification module 184, and discourse history subsystem 185 may implement or otherwise employ one or more machine learning algorithms and/or one or more ensembles of trained machine learning models of any suitable type as described herein.

2.00 Method for Machine-Learning Based Generation of Virtual Agent Responses in an Automated Discourse As shown in FIG. 2, a method 200 for machine learning-based generation of virtual agent responses in an automated discourse includes configuring an automated discourse with one or more virtual agents S210, identifying one or more candidate virtual agents S220, selecting one or more responding virtual agents based on the one or more candidate virtual agents S230, and surfacing one or more responses from the one or more responding virtual agents S240.

The techniques described herein may have one or more advantages. For instance, a virtual persona community may have many virtual personas (e.g., greater than 100). However, not every virtual persona within a virtual persona community may provide contextually relevant responses to a particular input provided by a user (e.g., a virtual persona that has an age set to below 15 may not provide contextually relevant responses to a question posed by a user about a career-related issue). Limiting a total number of responses to only those virtual personas that provide the most contextually relevant responses may reduce a latency associated with generating virtual persona responses and may reduce computational resources used for generating responses. For instance, generating responses for a portion of personas within a virtual persona community may have less latency and use fewer computational resources as compared to generating a response for every virtual persona within a virtual persona community.

Additionally, one of ordinary skill in the art will appreciate that method 200 has many technical advantages and practical applications over other techniques for simulating social research. For instance, using the most contextually relevant virtual personas may have an increased level of realism associated with interactions as compared to selecting a portion of virtual personas based on random sampling. Random sampling may fail to account for a level of engagement or willingness associated with a particular virtual persona. Accordingly, the responses generated by the techniques described herein may provide better insights according to how a particular group of human participants may respond to a particular question.

Further, the techniques described herein may introduce a persona selection mechanism that dynamically identifies the most relevant virtual personas using vector-based embeddings and k-nearest neighbors (k-NN) filtering. Other AI-driven chat systems may rely on rule-based or randomly sampled persona selection, leading to inefficient responses and unnecessary computational overhead. In contrast, the system described herein may process discourse input data by computing a semantic embedding vector representation and then retrieving persona data from a vector database implementing an approximate nearest neighbor (ANN) search. By calculating the vector distances between discourse embeddings and persona embeddings, the system may efficiently rank and select personas most relevant to a given conversation context, ensuring that only the most contextually appropriate personas are instantiated. This method reduces processing time and memory consumption and prevent redundant computations, overcoming latency and scalability limitations.

Further, the key-value (KV) caching value described herein may accelerate persona retrieval by storing frequently accessed persona query-responses and reducing redundant database queries. Other AI-driven chat systems may rely on repetitive and computationally expensive database lookups, which may increase latency and degrade performance when handling large-scale AI persona interactions. The system described herein may mitigate such inefficiencies by implementing a shared KV caching mechanism within a vector database framework, enabling faster retrieval of persona embeddings and discourse history without unnecessary recomputation. By reducing redundant computational processes and reducing repeated database queries, this caching strategy may enhanced response times lower system overhead and may increase scalability.

2.1 Configuring an Automated Discourse with One or More Virtual Agents

S210, which includes configuring an automated discourse, may function to configure and/or initiate an automated discourse that may involve a moderator and one or more virtual agents. A virtual agent, as generally referred to herein, may relate to a digital construct of a virtual or simulated entity that may function to interpret and contextualize moderator or user input (e.g., natural language input queries) to generate one or more responses. For instance, a synthetic discourse data service as described herein may receive, via an API endpoint of an API-based application, discourse data (e.g., natural language input queries) including a natural language utterance. An API endpoint may refer to a digital address (e.g., a URL) that receives requests from a client (e.g., receives discourse data from a user). Preferably, a virtual agent may be associated with a distinct virtual persona that may define one or more traits or characteristics of the virtual agent. An automated discourse, as generally referred to herein, may relate to an iterative discourse or discussion that may include one or more queries or utterances from a moderator and one or more responses from the one or more virtual agents. A moderator, as generally referred to herein, may relate to an entity (e.g., one or more users) that may guide, facilitate, or otherwise participate in the automated discourse by prompting or engaging the one or more virtual agents with one or more queries.

In one or more embodiments, an automated discourse may be configured and/or initiated by one or more users. It shall be noted that, in various embodiments, a user may refer to a user or subscriber of a system or service that may implement method 200 and/or one or more steps of method 200. In some embodiments, one or more of the one or more users may function as moderator(s) of the automated discourse. In such embodiments, one or more moderators may input one or more queries or utterances during the course of the automated discourse that may be responded to by one or more virtual agents.

Configuring Virtual Agents

Preferably, configuring the automated discourse may include configuring one or more virtual agents that may participate in the automated discourse. In some embodiments, configuring the automated discourse may include selecting a virtual persona community and/or one or more virtual personas that may participate as virtual respondents (virtual agents) in the automated discourse, as described in U.S. Provisional Application No. 63/613,860, which is incorporated herein in its entirety by this reference. In such embodiments, S210 may include assigning a distinct virtual persona to each virtual agent, such that each virtual agent may be associated with a corresponding virtual persona. In such embodiments, responses produced or output by each virtual agent in the automated discourse may be based on the corresponding virtual persona of the virtual agent.

Figure 3:
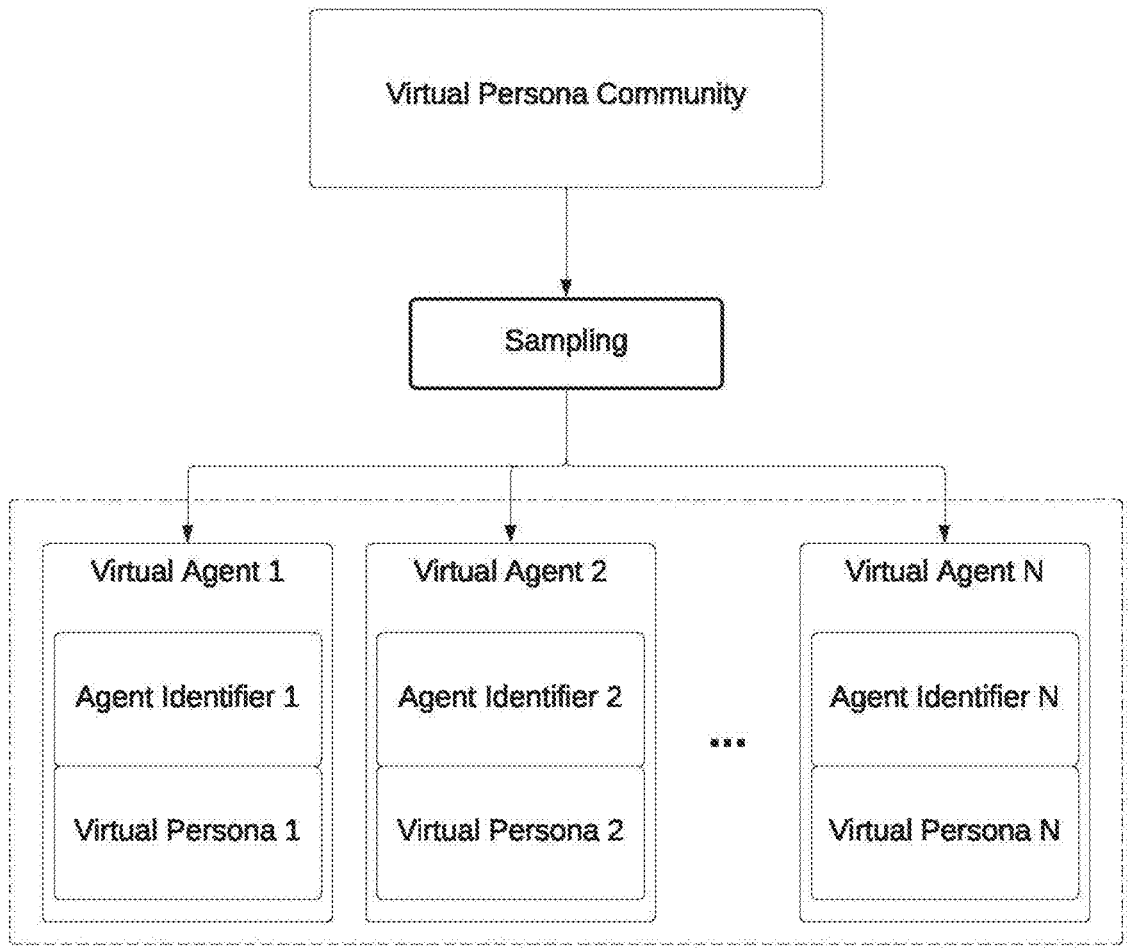
FIG. 3 illustrates a schematic representation of sampling a virtual persona community to configure virtual agents in accordance with one or more embodiments of the present application.

In one or more embodiments, one or more users may select or input a total number N of virtual agents that may participate in the automated discourse. In some embodiments, S210 may function to automatically sample a number N of virtual personas from the selected virtual persona community based on a suitable statistical or random sampling method, as shown by way of example in FIG. 3. In some embodiments, S210 may function to configure each of the N virtual agents with a corresponding sampled virtual persona from the selected virtual persona community.

In one or more embodiments, S210 may include assigning and/or generating an agent identifier for each virtual agent. In various embodiments, an agent identifier may refer to one or more labels (e.g., text labels) for a corresponding virtual agent that may function to identify and reference the corresponding virtual agent. In some embodiments, the agent identifier may include a first name identifier and a last name identifier that may relate to a first and last name of the virtual agent. In some embodiments, S210 may function to automatically generate the agent identifier for each virtual agent based on the corresponding virtual persona of the virtual agent. Additionally, or alternatively, in some embodiments S210 may enable one or more users to directly input or modify the agent identifiers for one or more (or all) virtual agents.

Automated Discourse

Figure 4:
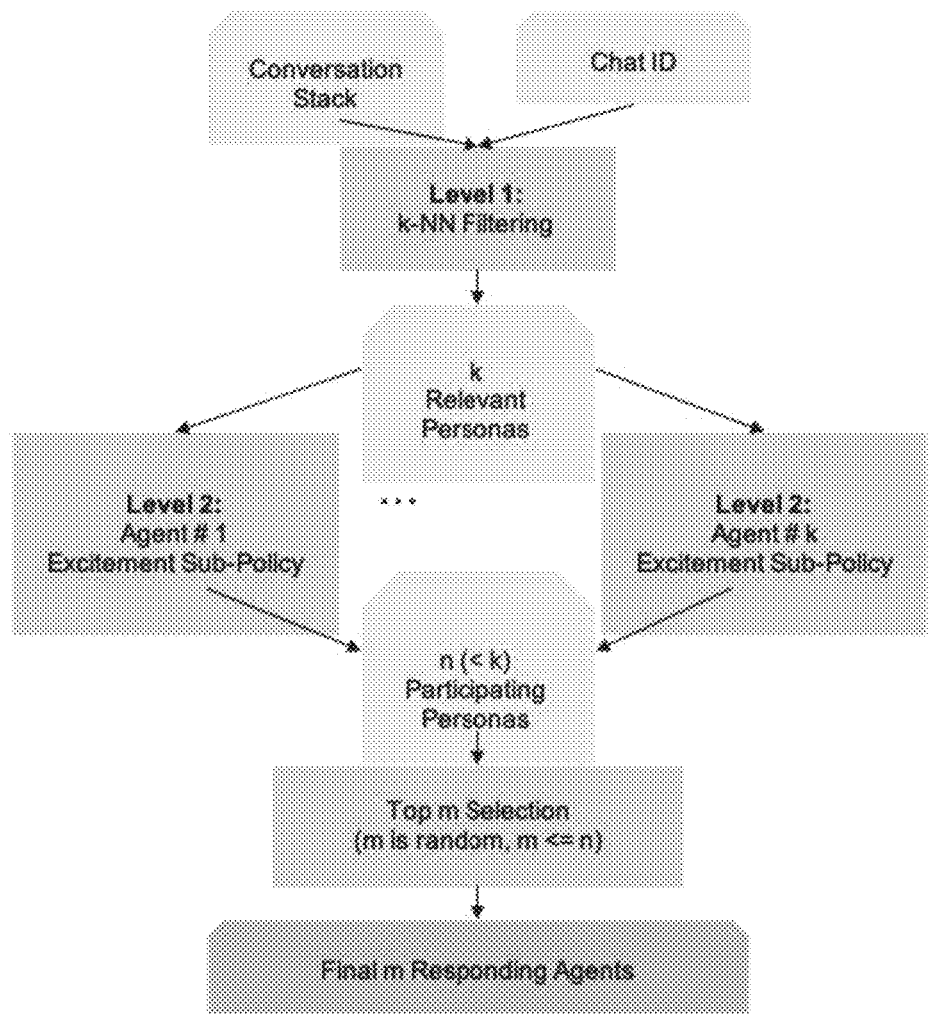
FIG. 4 illustrates a schematic representation of an example process for selecting one or more responding virtual agents in accordance with one or more embodiments of the present application.

Preferably, the automated discourse (sometimes referred to herein as an "automated conversation") may include one or more iterations or rounds of discussion between the moderator and the one or more virtual agents. In one or more embodiments, each round of the automated discourse may include a moderator query or utterance and one or more responses from one or more of the one or more virtual agents. In one or more embodiments, S210 may include receiving an initial moderator query or utterance at an initial timestep from one or more users that may initiate the automated discourse (e.g., an initial moderator query or prompt to start the discussion with the one or more virtual agents). In various embodiments, method 200 may then function to identify one or more responding agents and may generate and/or output one or more responses to the initial moderator query or utterance from the one or more responding virtual agents (as discussed in 2.2-2.4 and shown by way of example in FIG. 4). In some embodiments, once the one or more responses have been generated and/or output, method 200 may iteratively continue the automated discourse by receiving a subsequent moderator query or utterance. That is, in some embodiments, S210 may function to receive one or more subsequent moderator queries or utterances at one or more subsequent timesteps, and method 200 may in turn function to generate one or more virtual agent responses to the one or more subsequent moderator queries.

It shall be noted that, as sometimes used herein, the term "current" may refer to a temporal frame of reference that may include either an initial timestep or a subsequent timestep of the automated discourse.

Automated Discourse User Interface

In some embodiments, S210 may include implementing an automated discourse user interface that may enable the one or more users to configure, initiate, and/or manage the automated discourse. In one or more embodiments, the automated discourse user interface may be a graphical user interface (GUI) and may include one or more GUI elements that may function to receive user input and/or display output.

In various embodiments, the automated discourse user interface may include one or more virtual agent interface control objects that may enable one or more users to input, edit, configure, and/or modify one or more virtual agents participating in the automated discourse. In some embodiments, the one or more virtual agent interface control objects may include one or more virtual persona community selection control objects that may enable one or more users to select a virtual persona community for the one or more virtual agents. In some embodiments, the one or more virtual agent interface control objects may include a control object that may enable an input or selection of the total number of virtual agents to be configured to participate in the automated discourse. In some embodiments, the one or more virtual agent interface control objects may include one or more virtual agent configuration objects that may enable one or more users to input, edit, configure, and/or otherwise modify one or more virtual agent identifiers of each virtual agent, and/or the virtual persona of a virtual agent.

Additionally, or alternatively, in one or more embodiments, the automated discourse user interface may include one or more moderator input fields that may enable the moderator(s) to input one or more moderator queries or utterances. In such embodiments, the one or more moderator input fields may include one or more text input field (e.g., a text box, text area, and/or any other suitable text input field) that may function to receive text-based input from one or more users (e.g., the moderator(s)).

Figure 9:
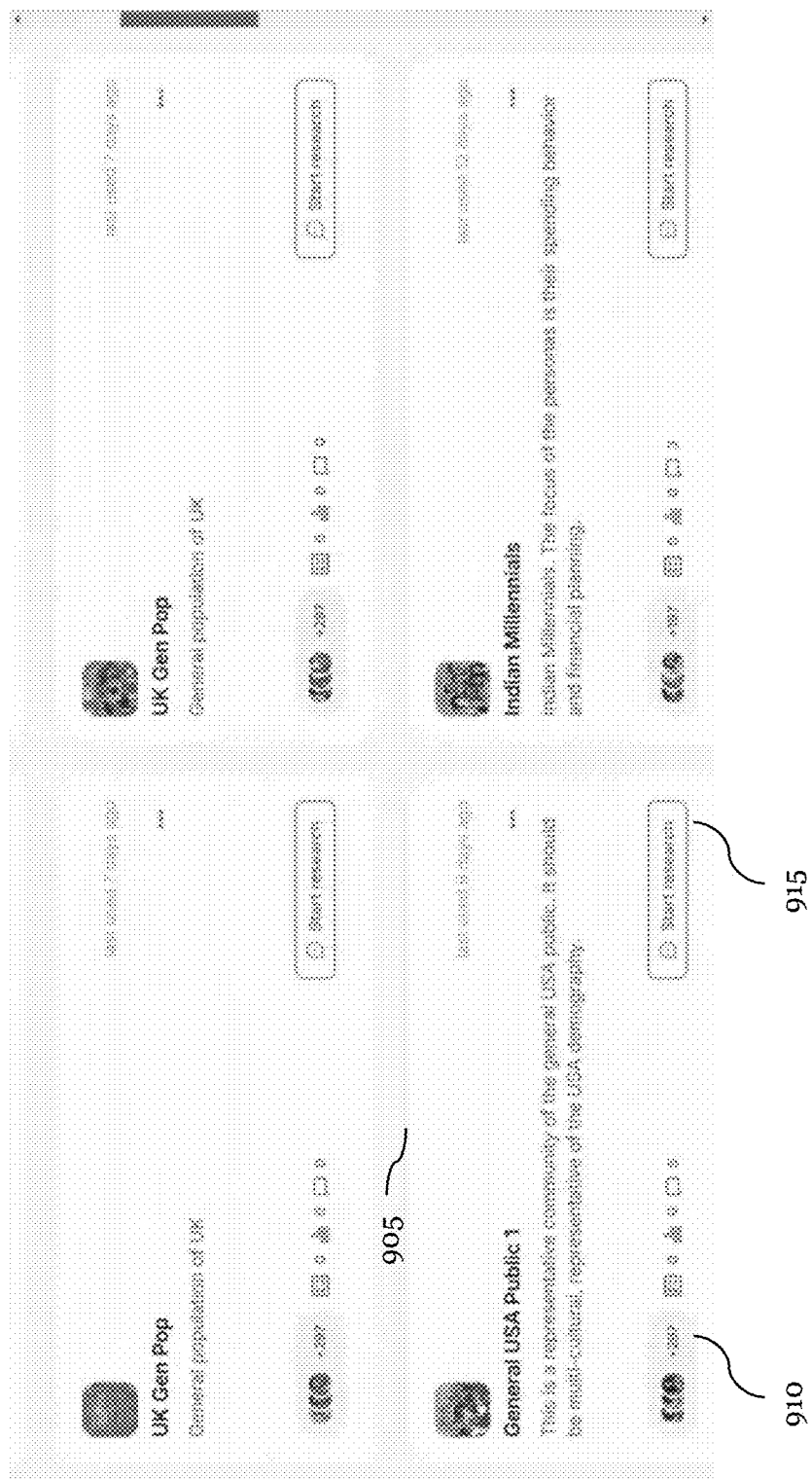
FIGS. 9 through 17 illustrate one or more views of a user interface in accordance with one or more embodiments of the present application.

A non-limiting example of a discourse user interface may be described with reference to FIGS. 9 through 17. FIG. 9 may depict various virtual persona communities for which research (e.g., focus group research, poll research, survey research) may be performed. For instance, the discourse user interface may include first user interface display elements 905 for each virtual persona community, where each first user interface display element 905 further includes a second user interface display element 910 indicating a number of virtual personas within the virtual persona community and a user interface control element 915. When a user interacts with (e.g., clicks) user interface control element 915, the user may be directed to the user interface view shown in FIG. 10 (e.g., if the user is initializing a research session for the virtual persona community for the first time) or a user interface view similar to FIG. 13 (e.g., if the user previously initialized a research session).

Figure 10:
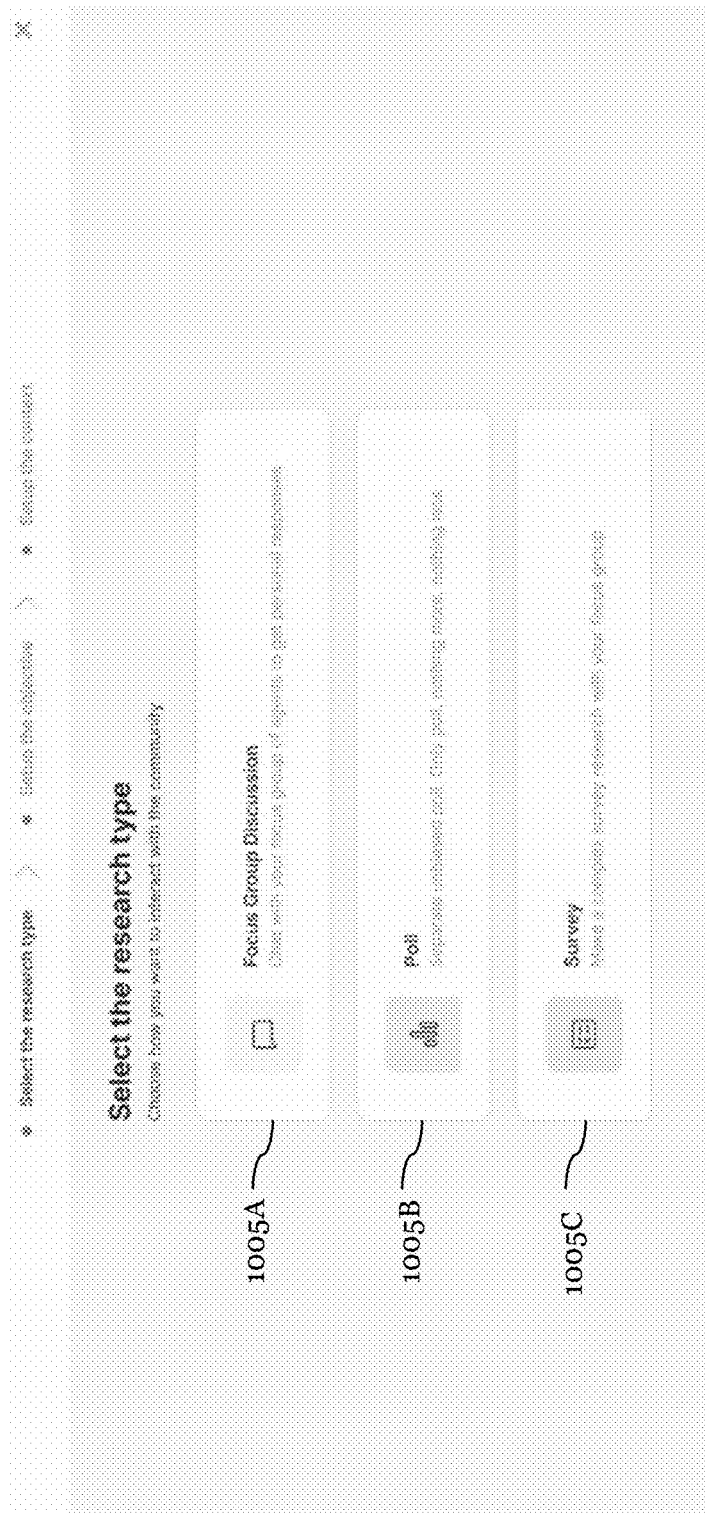

Assuming a user has not previously initialized a research session, the user may be directed to the user interface view shown in FIG. 10 upon clicking user interface control element 915. The user may select a type of research to be performed for the selected virtual persona community. For instance, the user interface view shown in FIG. 10 may include a first user interface control element 1005A for configuring a focus group discussion, a second user interface control element 1005B for configuring a poll, and a third user interface control element 1005C for configuring a survey. Upon clicking any of user interface control elements 1005A, 1005B, or 1005C, the user may be directed to the user interface view depicted in FIG. 11.

Figure 11:
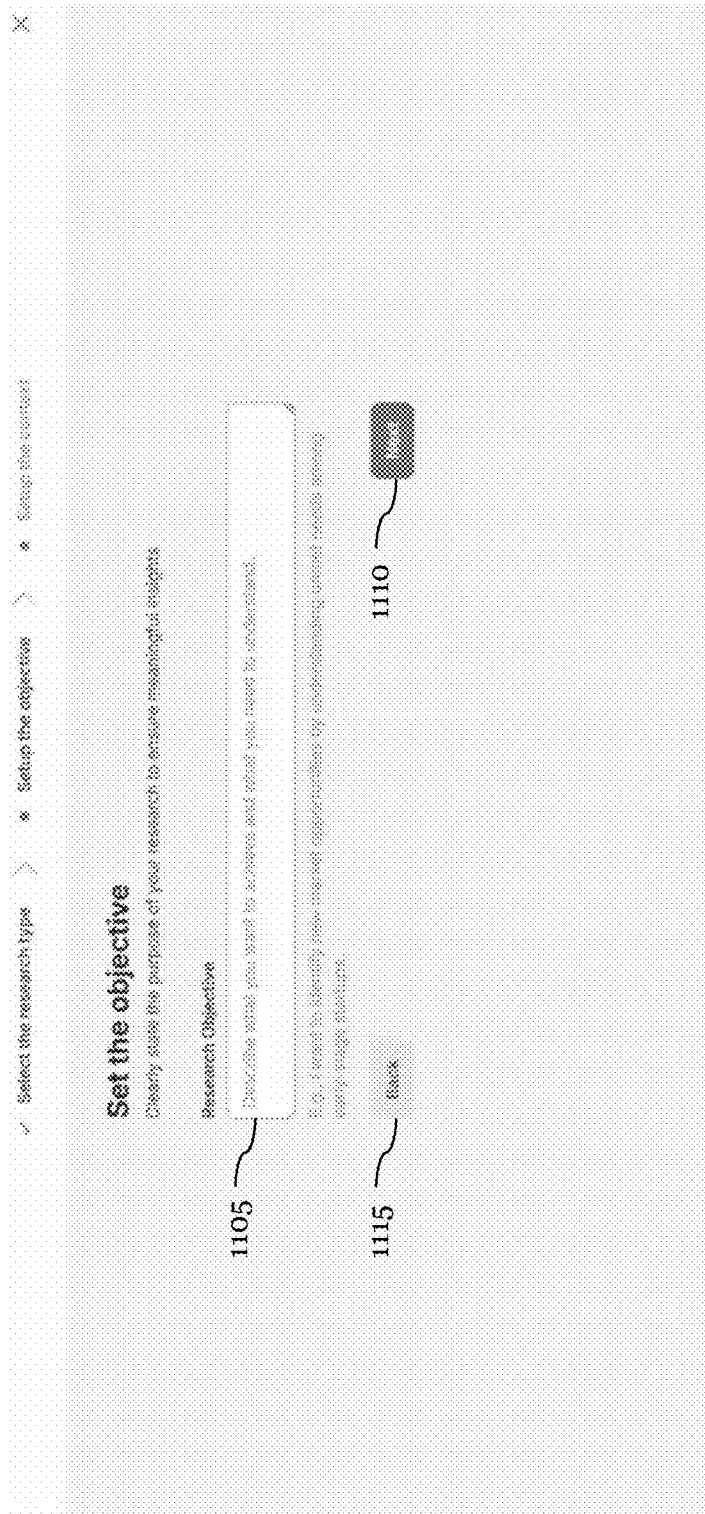

As depicted in FIG. 11, the user, after selecting the type of research to be performed, may set a research objective. For instance, the user may type (or paste), into user interface input element 1105, an indication of the research objective (e.g., "I want to understand the impression about flavored vitamin waters"). After inputting the indication of the research objective into user interface input element 1105, the user may interact with first user interface control element 1110 to configure the research objective and to be directed to the user interface view depicted in FIG. 12. Alternatively, the user may select the second user interface control element 1115 to be directed back to the user interface view depicted in FIG. 10 (e.g., for reconfiguring the research type).

Figure 12:
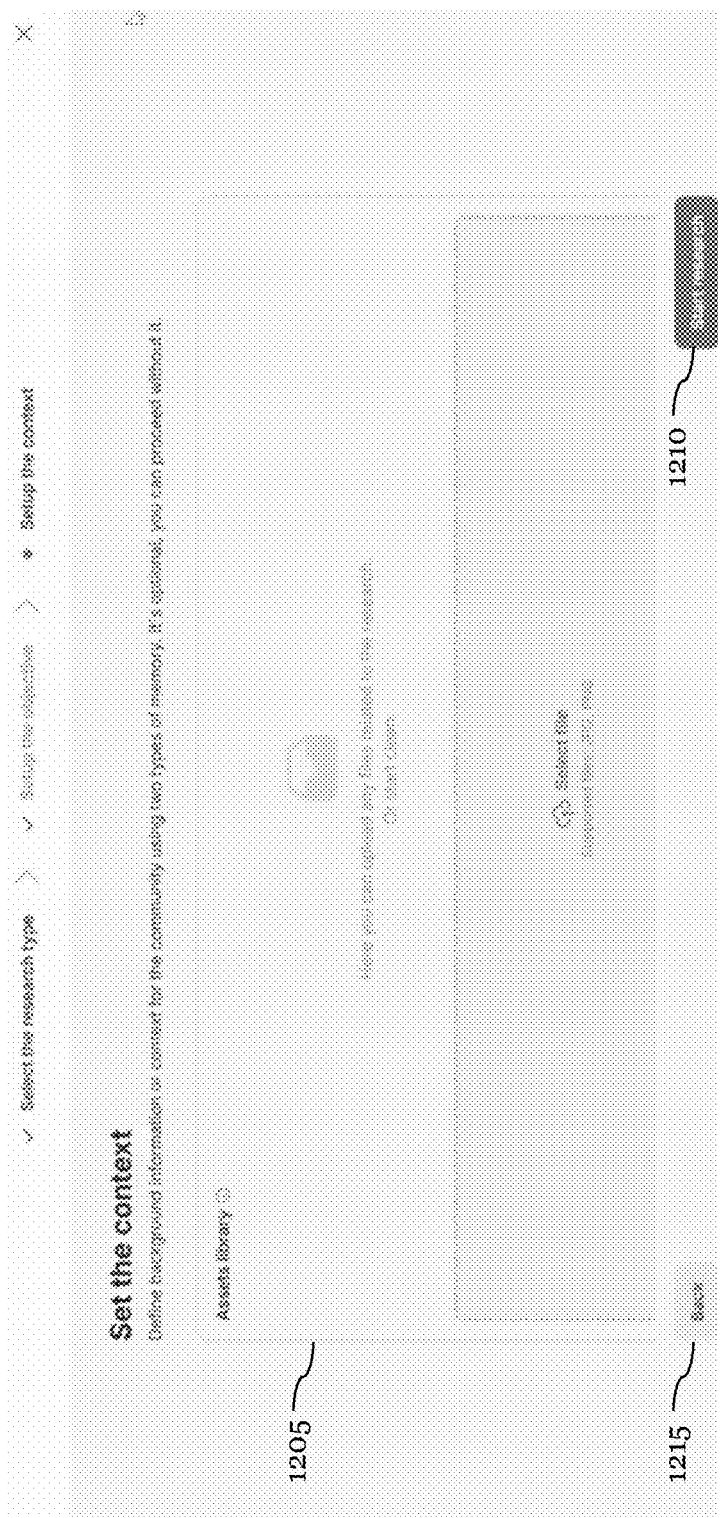

As depicted in FIG. 12, the user, after configuring the research objective, may define context for the research being performed. For instance, the user may provide, to user interface input element 1205, a file that defines background information or context for a virtual persona community. After providing the file to user interface display element 1205, the user may interact with first user interface control element 1210 to upload the file and to be directed to the user interface view depicted in FIG. 12. Alternatively, the user may select the second user interface control element 1215 to be directed back to the user interface view depicted in FIG. 11 (e.g., for reconfiguring the research objective).

Figure 13:
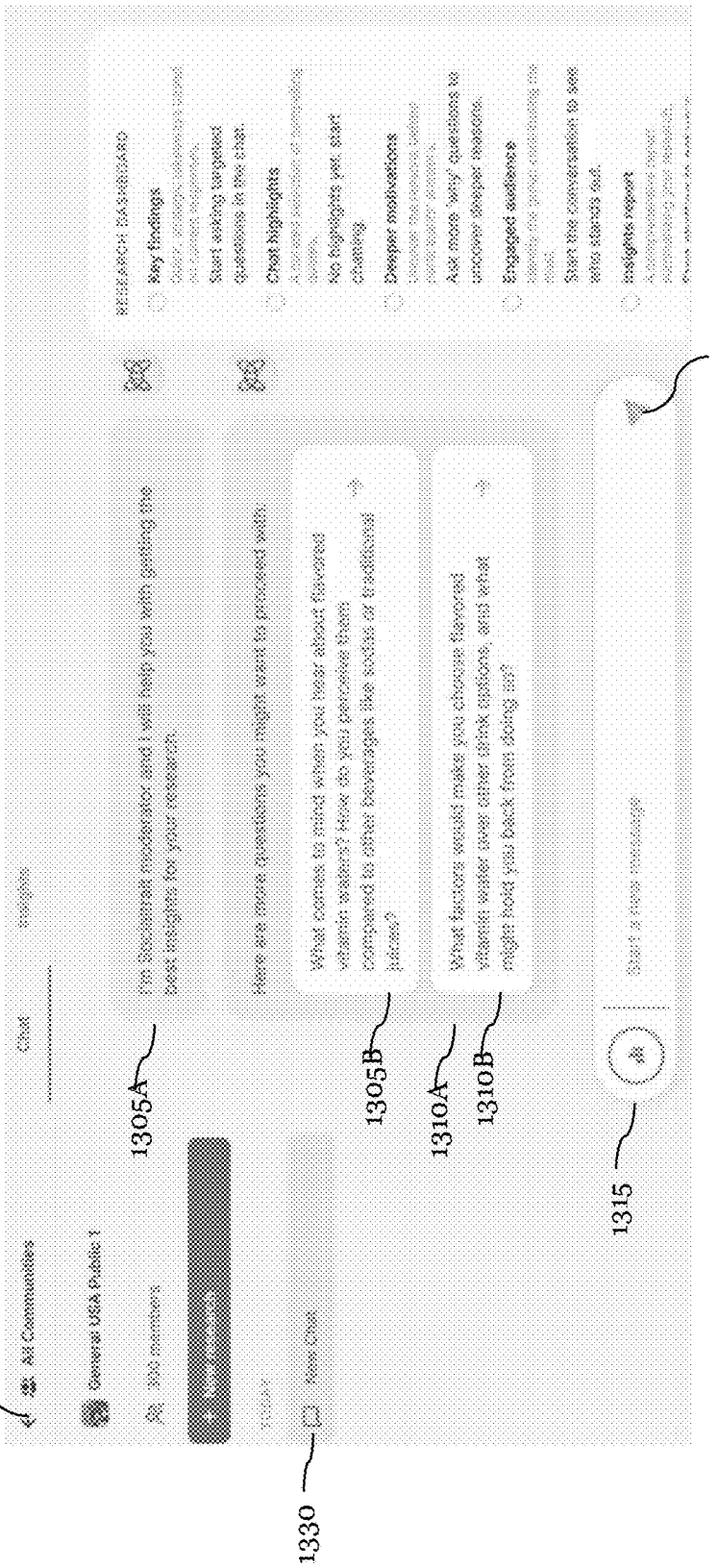

The user may proceed to the user interface view of FIG. 13 (e.g., upon pressing first user interface control element 1210 or user interface control element 915). The user interface view of FIG. 13 may depict a conversational view between a user and the virtual persona community. A virtual moderator may facilitate a user's interaction with the virtual persona community. For instance, when a user initializes the user interface view of FIG. 13 for a new virtual persona community for the first time, the virtual moderator may provide a first message with an introduction and a second message suggesting questions to ask. For instance, the second message may indicate multiple questions a user may ask the virtual persona community. The first message with the introduction may be displayed in first user interface display element 1305A and the second message with the suggested questions may be displayed in second user interface display element 1305B. A first suggested question may be displayed within a first sub-element 1310A of second user interface display element 1305B and a second suggested question may be displayed within a second sub-element 1310B of second user interface display element 1305B.

The user may provide a natural language input via user interface input element 1315 and may submit the natural language input via interaction with (e.g., clicking) first user interface control element 1320. The user may be directed to the user view depicted in FIG. 9 when interacting with (e.g., clicking) second user interface control element 1325. Additionally, the user may begin a new chat via interaction with (e.g., clicking) user interface control element 1330.

Figure 14:
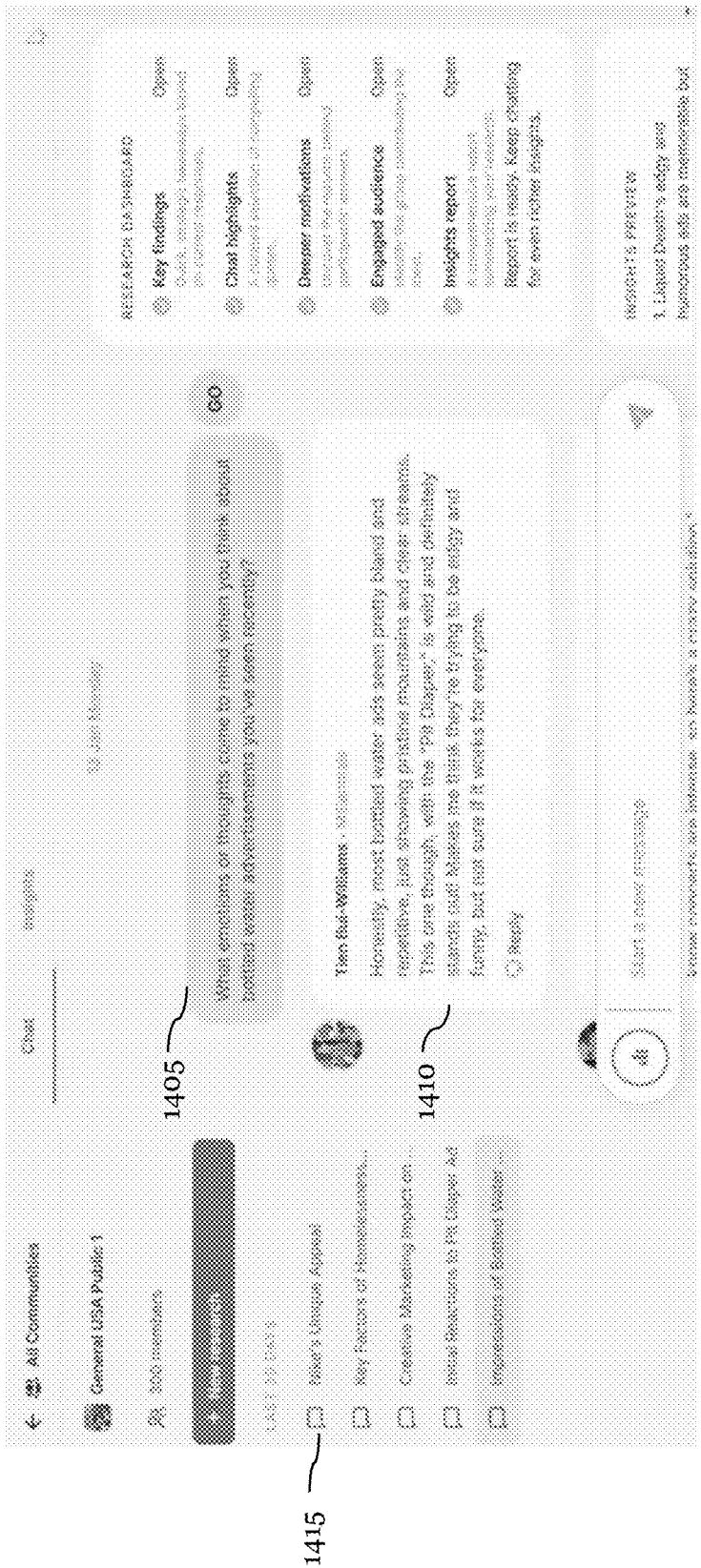

An example of a provided natural language input (e.g., a user utterance) and a corresponding response from a responding virtual agent may be depicted in FIG. 14. For instance, the user may provide the natural language input via the first user interface control element 1320 and a copy of the natural language input may be depicted in first user interface display element 1405. A responding virtual persona (e.g., determined according to the techniques described herein) may respond to the natural language input and the response may be depicted in second user interface display element 1410. Additionally, FIG. 14 may depict one or more chats that the user has engaged in the virtual persona community with (e.g., in third user interface display element 1415).

Figure 15:
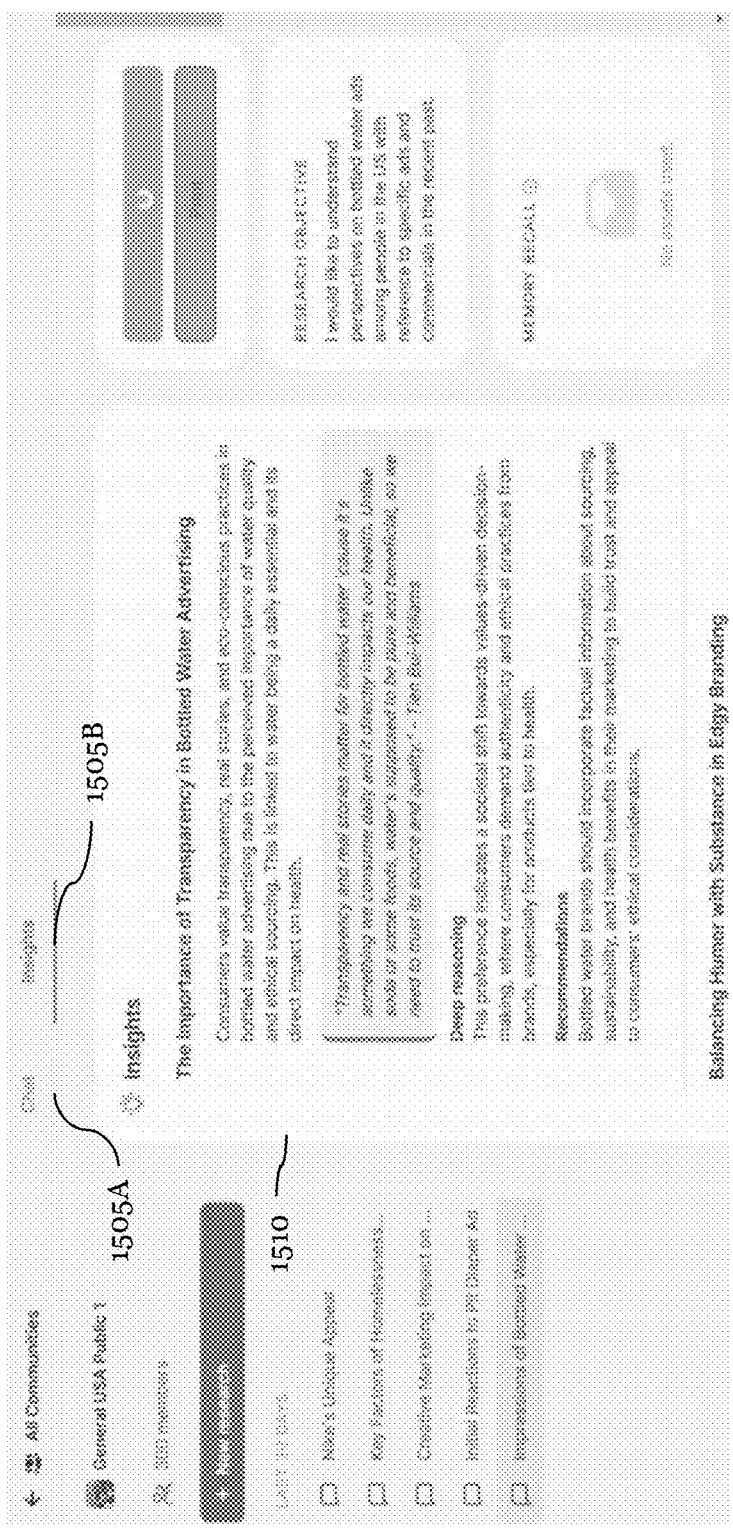
Figure 16:
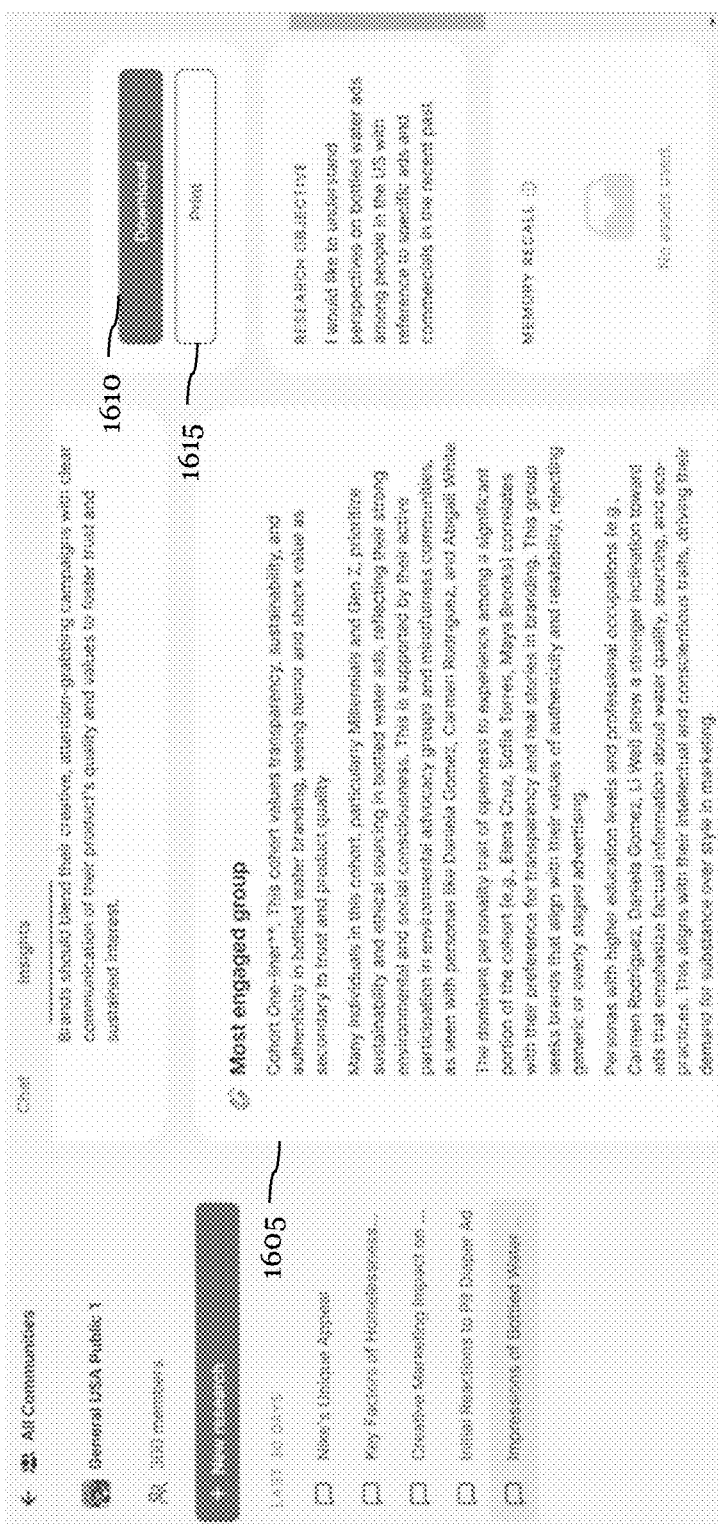
Figure 17:
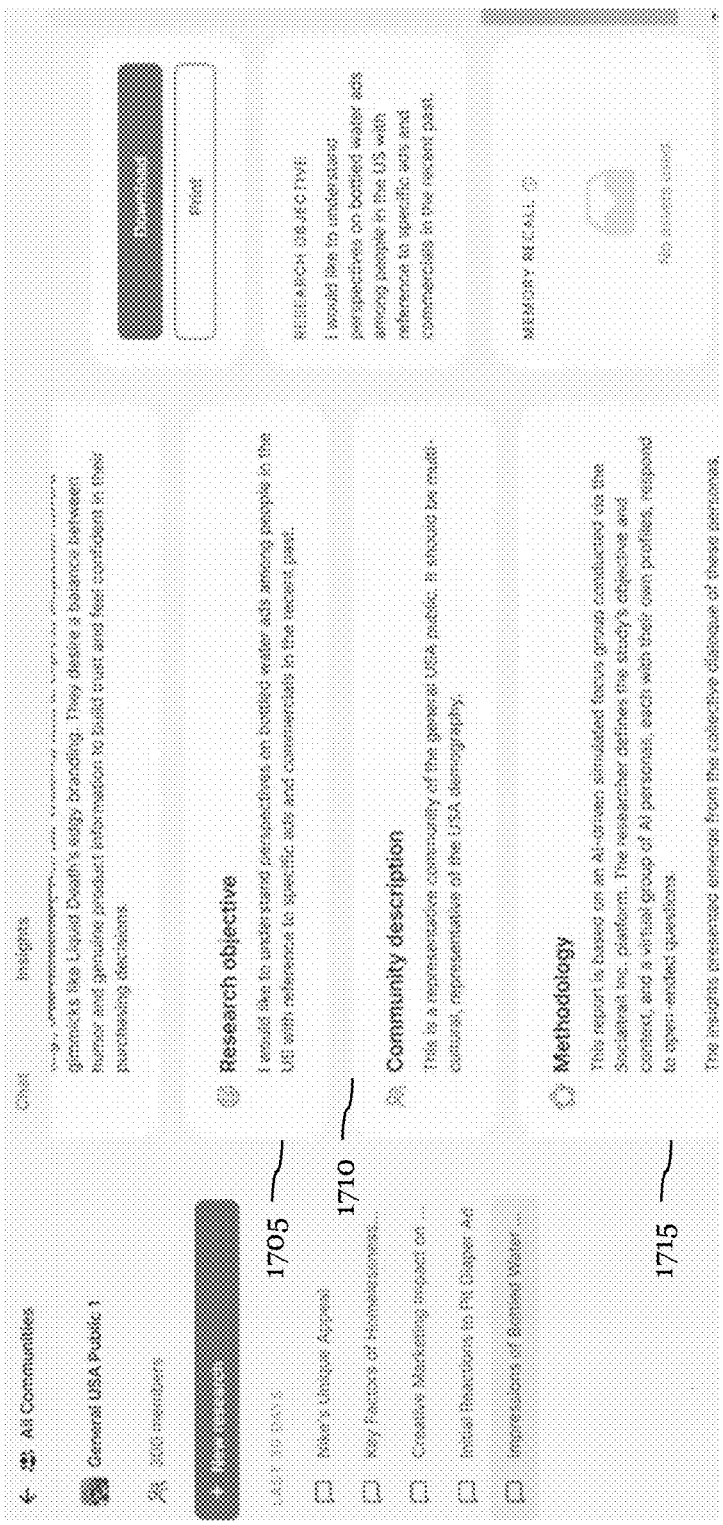

Insights generated from a user interacting with a virtual persona community (e.g., via natural language inputs) may be depicted in FIGS. 15 through 17. For instance, when a user interacts with (e.g., clicks on) tab 1505A of FIG. 15, the user may be directed to a user interface view similar to FIGS. 13 and 14. However, when a user interacts with (e.g., clicks on) tab 1505B of FIG. 15, the user may be directed to a user interface view similar to FIGS. 15 through 17. The user interface view under the tab 1505B may include an insights display section 1510 (e.g., as depicted in FIG. 15), an engagement display section 1605 (e.g., as depicted in FIG. 16), a research objective display section 1705 (e.g., as depicted in FIG. 17), a community description display section 1710 (e.g., as depicted in FIG. 17), and a methodology display section 1715 (e.g., as depicted in FIG. 17). The insights display section 1510 may display one or more insights into the topics discussed by the user and may include one or more recommendations. The engagement display section 1605 may indicate a certain portion (e.g., cohort) of the virtual persona community most engaged with the topics discussed by the user (e.g., virtual personas that respond most often). Research objective display section 1705 may indicate the research objective specified by the user (e.g., configured within user interface display element 1105 of FIG. 11). Community description display section 1710 may indicate a description of the virtual persona community. Methodology description display section 1715 may indicate the methodology performed to gain the insights.

The user interface may further include a capability for downloading and/or printing generated insights. For instance, as depicted in FIG. 16, the user interface view may include a first user interface control element 1610 for downloading an insights report and a second user interface control element 1615 for printing an insights report. The insight report may include the information indicated within insights display section 1510, engagement display section 1605, research objective display section 1705, community description display section 1710, and methodology display section 1715.

2.2 Identifying One or More Candidate Virtual Agents

S220, which includes identifying one or more candidate virtual agents (sometimes referred to herein as "candidate agents"), may function to identify one or more virtual agents that may produce one or more responses to a current moderator query and/or otherwise participate in the automated discourse. For instance, S220 may identify, by the discourse service, a set of candidate computer-simulated personas (e.g., a set of candidate virtual agents) by retrieving persona data from a vector database, where each computer-simulated persona of the set of is associated with a distinct persona dataset stored in a persona data repository (e.g., data repository 170 as described herein). The term "vector database" may refer to a database enabling storing, indexing, and searching of vector embeddings (e.g., virtual persona embeddings as described herein). The term "persona dataset" may, in some examples, refer to a set of persona attributes relating to a particular virtual persona (e.g., psychographic attributes, demographic attributes).

Retrieving persona data from the vector database may include implementing a shared key-value (KV) caching mechanism that optimizes inference performance by storing common persona-query responses and reducing redundant computations across similar persona selection requests. Retrieving persona data from the vector database may additionally, or alternatively, include performing context-aware truncation of historical discourse data when a history length of the historical discourse data exceeds a predefined context window (e.g., when data is timestamped before a threshold timestamp relative to a reference time, such as the current time), where recent-in-time and semantically relevant discourse data are retained for persona selection and synthetic discourse data generation. In some examples, identifying candidate personas from the persona data repository includes performing a k-nearest neighbors (k-NN) filtering operation to generate an initial ranked list of personas based on their vector similarity to the discourse input data, where personas that exceed a predefined similarity threshold are prioritized for engagement consideration.

A candidate virtual agent, as referred to herein, may relate to a virtual agent that may have a corresponding virtual persona that may be relevant to the current moderator query and/or the current topic or state of the automated discourse based on the virtual experiences, traits, views, experiences, and/or other suitable characteristics or values of the corresponding virtual persona. In one or more embodiments, one or more candidate agents may be identified as candidates that may be provided an opportunity to respond in the automated discourse based on the characteristics of the virtual personas of the candidate agents.

Automated Discourse History and Digest

In some preferred embodiments, identifying the one or more candidate agents may include generating an automated discourse digest. An automated discourse digest, as referred to herein, may relate to a text-based synopsis or summation of the automated discourse at a current point in time or current timestep. In some embodiments, the automated discourse digest may include and/or be otherwise based on the current moderator query or utterance and an automated discourse history of the current automated discourse. An automated discourse history (sometimes referred to herein as a conversation history or an automated discourse stack) may refer to a text-based data object comprising a record or transcript that may include all previous moderator queries or utterances and virtual agent responses of an automated discourse. In one or more embodiments, S220 may function to generate an automated discourse digest that may be configured and/or optimized to enable S220 to identify the relevance of one or more virtual personas to the current state of the automated discourse.

Figure 5:
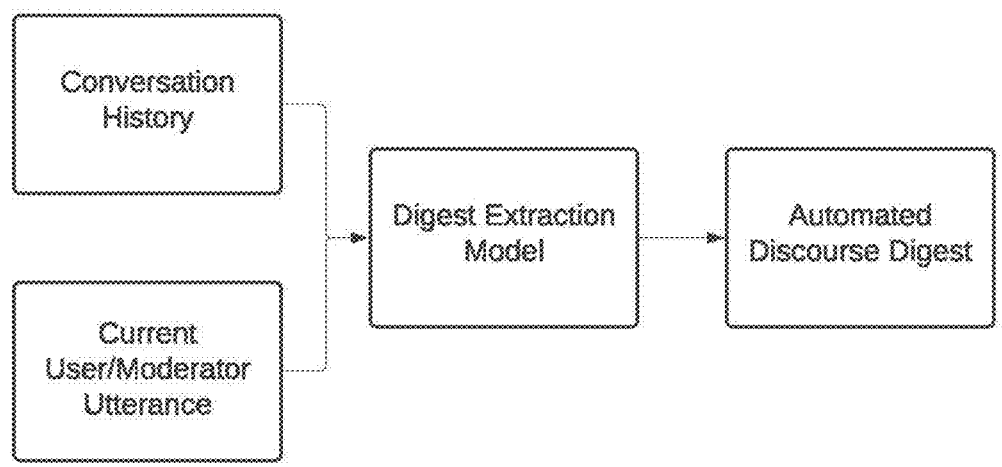
FIG. 5 illustrates a schematic representation of an example data processing flow for generating an automated discourse digest in accordance with one or more embodiments of the present application.

In some preferred embodiments, as shown by way of example in FIG. 5, S220 may include implementing and/or employing a discourse digest extraction model, which also may be referred to as a discourse processing module, that may function to output the automated discourse digest. In some such embodiments, S220 may function to provide one or more inputs to the discourse digest extraction model that may include the automated discourse history and the current user/moderator query or utterance. In turn, the discourse digest extraction model may function to generate or produce an output that may include the automated discourse digest. For instance, the discourse processing module may extract contextual information from the user input (e.g., a user/moderator query or utterance) and may retrieve stored discourse history from a data repository (e.g., discourse history subsystem 185 as described with reference to FIG. 1). In some embodiments, the discourse digest extraction model may include a large language model (LLM) or the like, or an ensemble of models, that may receive input and/or produce output in a natural language format. In some such embodiments, the inputs to the discourse digest extraction model may be provided and/or configured based on one or more natural language prompts. In one or more embodiments, the discourse digest extraction model may be configured to avoid repetition of one or more words, names, phrases, and/or the like that may introduce undesirable bias in the automated discourse digest. In some such embodiments, avoiding biases in the automated discourse digest may provide the technical advantage of optimizing the automated discourse digest to represent what a user/moderator intends to discuss in the current timestep of the automated discourse.

Alternatively, in some embodiments, S220 may function to generate the automated discourse digest based on concatenating the automated discourse history, and/or a summary of the automated discourse history, with the current moderator query or utterance, such that the automated discourse digest may comprise a unified text object that may include both the automated discourse history and the current moderator query or utterance (e.g., a composite string). It shall be noted that, in some preferred embodiments, generating the automated discourse digest via the discourse digest extraction model rather than concatenation may provide the technical benefit of avoiding biases in the discourse digest based on repetition of words, names, and/or phrases, as discussed above.

Computing Embeddings

Figure 6:
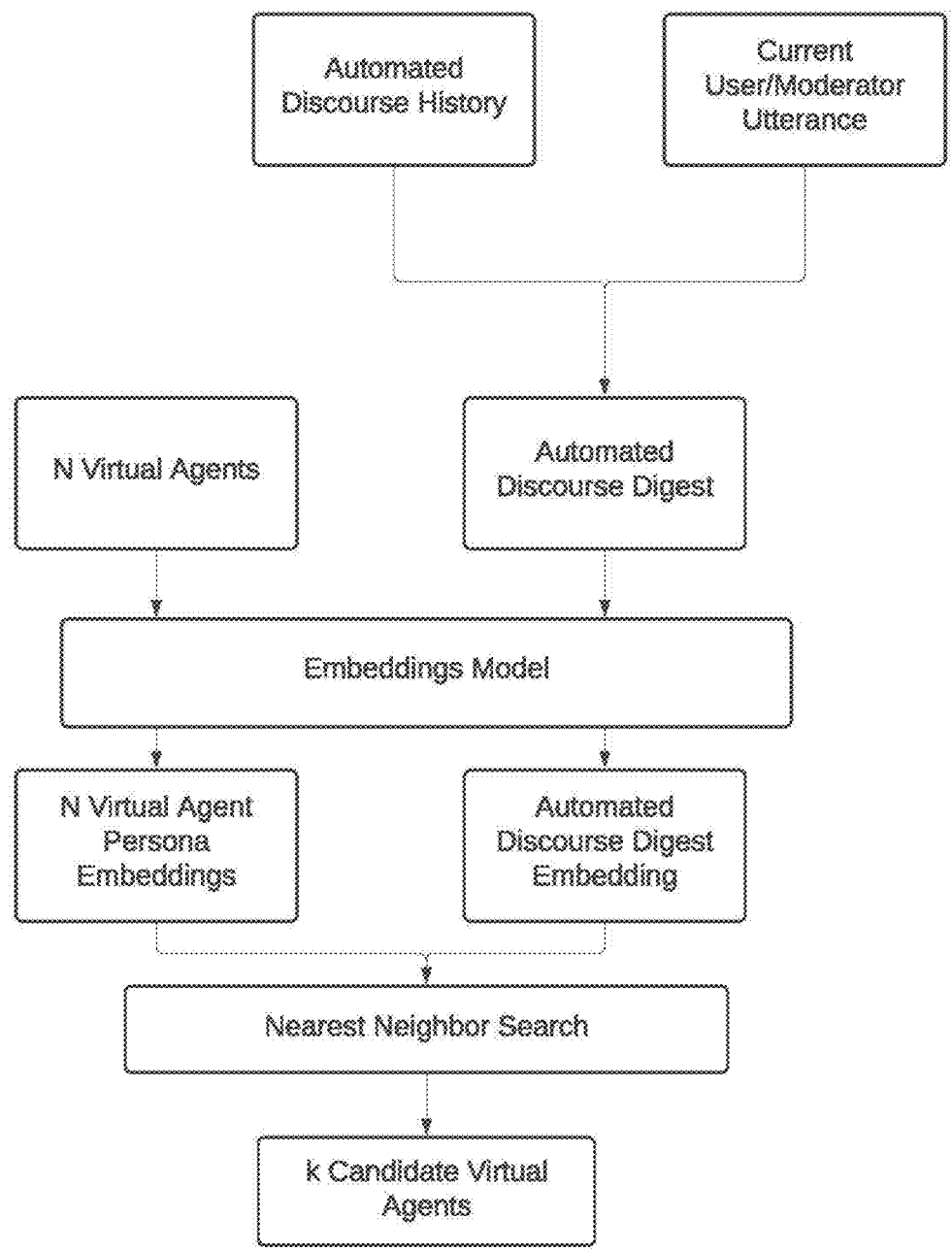
FIG. 6 illustrates a schematic representation of an example process for identifying one or more candidate virtual agents in accordance with one or more embodiments of the present application.

In some embodiments, S220 may include computing an automated discourse digest embedding and/or one or more virtual persona embeddings, as shown by way of example in FIG. 6. For instance, a discourse service as described herein may generate, using an embedding generation model executed on a GPU-accelerated computing environment, an embedding vector representation of discourse input data (e.g., an automated discourse digest embedding). A "GPU-accelerated computing environment" may refer to a system that utilizes GPUs for performing parallel computations.

The discourse service, in some examples, may process, by the one or more computers executing the API-based application, the discourse input data, where the processing includes extracting contextual data from the discourse input data and using a client identifier associated with the client device to retrieve historical discourse data from a computer database. Further, processing the discourse input data may include creating an embedding vector representation based on the historical discourse data. For instance, the embedding vector representation of the discourse input data may encode semantic and conversation features based on the historical discourse data. Additionally, the discourse service may generate, using the embedding generation model, a persona embedding vector (e.g., a virtual persona embedding) for each computer-simulated persona based on persona attributes stored within a given persona dataset associated with each respective computer-simulated persona. The term "persona attributes" may refer to one or more traits (e.g., psychographic traits, demographic traits) attributed to a particular persona.

An automated discourse digest embedding, as referred to herein, may relate to an n-dimensional vector representation of the automated discourse digest textual data. A virtual persona embedding, as referred to herein, may relate to an n-dimensional vector representation of the virtual persona variable values, virtual persona characteristics or properties, and/or any other suitable virtual persona data. In one or more embodiments, S220 may function to compute or generate a virtual persona embedding for each virtual agent based on the corresponding virtual persona of the virtual agent.

In some embodiments, S220 may include implementing an embeddings model, which may also be referred to as an embedding generation module, that may function to compute the automated discourse digest embedding and/or the one or more virtual persona embeddings. In such embodiments, the embeddings model may function to receive, as input, the automated discourse digest and/or one or more virtual personas associated with the one or more virtual agents, and in turn the embeddings model may function to compute (e.g., generate) an n-dimensional vector (embedding) for each corresponding input (e.g., a contextual embedding vector that encodes semantic and conversational features based on the discourse history). Additionally, or alternatively, S220 may include employing and/or implementing an embeddings service that may function to output the automated discourse digest embedding and/or the one or more virtual persona embeddings based on inputs of the automated discourse digest and/or the one or more virtual personas.

Additionally, or alternatively, in some embodiments, one or more (or all) of the virtual persona embeddings may be sourced or retrieved from corresponding virtual persona artifacts and/or a corresponding virtual community digital artifact, as described in U.S. Provisional Application No. 63/613,860. That is, in some embodiments, the virtual persona artifacts and/or the virtual community digital artifact may include one or more corresponding virtual persona embeddings, and S220 may include sourcing or retrieving those corresponding virtual persona embeddings that may correspond to the one or more virtual agents.

Identifying Candidate Virtual Agents

In some embodiments, S220 (e.g., at the discourse service) may extract, in real-time (e.g., or near real-time), a subset of personas (e.g., responding virtual agents) from the set of candidate computer-simulated personas based on computing a persona relevance for each candidate persona of the set of candidate computer-simulated personas. The extracting may include computing in real-time, by the one or more computers executing the API-based application, a vector distance between the vector representation of the discourse input data and a persona vector representation associated with each computer-simulated persona of the set of candidate computer-simulated personas and dynamically selecting the subset of personas based on identifying candidate personas having a vector distance that satisfies or does not exceed a maximum vector distance threshold. For instance, the discourse service may identify one or more candidate virtual agents by implementing and executing (e.g., by an agent selection module) a nearest neighbor search in vector space based on the automated discourse digest embeddings and the virtual persona embeddings, as shown by way of example in FIG. 6. In some such embodiments, S220 may include identifying a subset of k virtual agents as candidate virtual agents from among the total number of the one or more virtual agents of the automated discourse, where k is greater than or equal to one. In some examples, each virtual agent may be associated with a distinct persona profile stored in a persona database (e.g., within virtual persona community generation subsystem 105, such as within data repository 170). A persona profile may refer to one or more of the attributes that define a particular virtual persona (e.g., expertise, communication tendencies, and behavioral characteristics).

In some such embodiments, identifying the subset of k virtual agents may include computing a digest embedding distance for each virtual agent (e.g., performing a vector similarity comparison). In one or more embodiments, a digest embedding distance, as referred to herein, may relate to a computed distance based on a vector space distance metric (e.g., cosine distance or similarity, Euclidean distance, and/or the like) between the virtual persona embedding of a virtual agent (e.g., a persona embedding vector) and the automated discourse digest embedding (e.g., a contextual embedding vector). In some such embodiments, the digest embedding distance of a virtual agent may represent a relevance of the virtual persona of the virtual agent to the topic and/or state of the automated discourse.

In some embodiments, S220 may include computing a digest embedding distance for each virtual agent and, in turn, sorting each virtual agent in order based on the computed digest embedding distance. In some such embodiments, virtual agents with lower digest embedding distances may have corresponding virtual personas that may be more relevant to the current topic or state of the automated discourse, and virtual agents with higher digest embedding distances may have corresponding virtual personas that may be less relevant to the current topic or state of the automated discourse. In one or more embodiments, S220 may function to identify the k virtual agents with the k lowest digest embedding distances (e.g., the k nearest neighbors to the automated discourse digest embedding), and in turn S220 may function to select and/or output those k virtual agents as candidate virtual agents. That is, the k-virtual agents may represent a ranked subset of candidate virtual agents.

2.3 Selecting one or more Responding Virtual Agents based on the one or more Candidate Virtual Agents S230, which includes selecting one or more responding virtual agents based on the one or more candidate virtual agents, may function to identify and/or select one or more responding virtual agents from among the one or more candidate virtual agents. In various embodiments, a responding virtual agent, as generally referred to herein, may relate to a virtual agent that may be identified and/or selected to generate a response to a current moderator query and/or another virtual agent response in the automated discourse. In other words, in various embodiments, a responding virtual agent may refer to a virtual agent that may be identified or selected to actively participate in the automated discourse at a current timestep. In one or more embodiments, S230 may include computing a unified willingness score for each of the one or more candidate agents. A unified willingness score, as generally referred to herein, may relate to a value (e.g., a numerical value) that may indicate a simulated willingness or enthusiasm of a corresponding virtual agent to respond to a moderator query or otherwise participate in the automated discourse at a distinct moment in time or timestep.

In some examples, S230 may include computing, by the one or more computers executing the API-based application, a discourse activation value (e.g., a unified willingness score) for each candidate persona of the subset of personas, where the discourse activation value indicates a degree of interest of a given computer-simulated persona in engaging in a given virtual discourse associated with the discourse input data. Computing the discourse activation value for each candidate persona may include generating a confidence score based on normalized log probabilities of a participation decision of a given candidate persona, where the confidence score is used to rank each candidate persona and dynamically adjust a likelihood of each candidate persona being selected for engagement in the simulated discourse session. Computing the discourse activation value for each candidate persona may, additionally or alternatively, include generating an excitement score by combining a persona-specific willingness score computed based on intrinsic attributes of a given candidate persona with a conversation-based willingness score computed based on the intrinsic attributes of the given candidate persona together with attributes of the historical discourse data, where the excitement score modulates persona participation likelihood using an exponential smoothing function.

Persona Willingness Scores

In some preferred embodiments, S230 may include computing a persona willingness score (e.g., a persona willingness factor representing an agent's intrinsic engagement tendency) for each of the one or more candidate agents based on the respective virtual persona of each candidate agent. In one or more embodiments, a persona willingness score of a virtual persona may refer to a value that may indicate a degree of willingness or tendency of the virtual persona (or a virtual agent with the virtual persona) to participate in any conversation at any point in time (e.g., provide a response in a conversation), regardless of the details or topic(s) of the conversation. In one or more embodiments, a higher persona willingness score may indicate a higher willingness or tendency of the corresponding virtual persona (or virtual agent with the corresponding virtual persona) to participate in a conversation, and a lower persona willingness score may indicate a lower willingness or tendency to participate in a conversation. In a non-limiting example, a persona willingness score may be a numerical value between zero and one (inclusive), where a value of zero may represent a complete lack of willingness of the corresponding virtual persona to participate in any conversation and a value of one may represent a complete willingness of the corresponding virtual persona to participate in any conversation. In such an example, a persona willingness score may be a numerical value with a specified number of decimal places (e.g., two decimal places, such as a persona willingness score of 0.85). It shall be noted that the above example is non-limiting, and a persona willingness score may be a numerical value in any predefined range (e.g., between 0 and 100, between 1 and 5, and/or the like). Alternatively, it shall be noted that a persona willingness score may be a character or text value in a character- or text-defined range (e.g., from A to Z). Alternatively, it shall be noted that a persona willingness score may include or be associated with a persona willingness level (e.g., low willingness, medium willingness, high willingness, and/or the like).

Preferably, the persona willingness score of a virtual persona may be based on the traits and characteristics represented by one or more persona variable values of the virtual persona. In various embodiments, persona variable values that may influence the persona willingness score of a virtual persona may include, but are not limited to, persona variable values for introversion/extraversion, openness, and/or any other persona variable values that may relate to the willingness of a virtual persona to participate in a conversation.

In some embodiments, S230 may include implementing a persona willingness model that may function to compute or output one or more persona willingness scores for one or more corresponding virtual personas. In one or more embodiments, the persona willingness model may include one or more machine-learning models, and/or one or more ensembles of machine-learning models. In some preferred embodiments, the persona willingness model may include a machine learning model (e.g., a large language model (LLM)) or the like, or an ensemble of models, that may receive input and/or produce output in a natural language format. In some embodiments, the persona willingness model may be provided one or more distinct virtual personas as input, and in turn the persona willingness model may function to compute or output a persona willingness score for each input virtual persona.

Conversation Willingness Scores

In some preferred embodiments, S230 may include computing a conversation willingness score (e.g., a conversation willingness factor) for each candidate agent. In one or more embodiments, a conversation willingness score of a candidate agent may refer to a value that may indicate a degree of willingness or tendency of the candidate agent to participate in the current automated discourse (e.g., provide a response in the current automated discourse) at a current point in time or current timestep based on the context of the automated discourse history. In one or more embodiments, a higher conversation willingness score may indicate a higher willingness or tendency of the corresponding candidate agent to participate in the current automated discourse conversation at a current point in time or current timestep, and a lower conversation willingness score may indicate a lower willingness or tendency to participate in the current automated discourse at the current point in time or current timestep. In a non-limiting example, a conversation willingness score may be a numerical value in a range between zero and one (inclusive), where a value of zero may represent a complete lack of willingness of the corresponding candidate agent to provide a response in the current automated discourse at a current timestep and a value of one may represent a complete willingness of the corresponding virtual persona to provide a response in the current automated discourse at the current timestep. In such an example, a conversation willingness score may be a numerical value with a specified number of decimal places (e.g., two decimal places, such as a conversation willingness score of 0.85). It shall be noted that the above example is non-limiting, and a conversation willingness score may be a numerical value in any predefined range (e.g., between 0 and 100, between 1 and 5, and/or the like). In some preferred embodiments, S230 may function to compute one or more conversation willingness scores and one or more persona willingness scores based on a same willingness range (e.g., between 0 and 1). Alternatively, it shall be noted that a conversation willingness score may be a character or text value in a character- or text-defined range (e.g., from A to Z). Alternatively, it shall be noted that a conversation willingness score may include or be associated with a conversation willingness level (e.g., low conversation willingness, medium conversation willingness, high conversation willingness, and/or the like).

Preferably, the conversation willingness score of a candidate agent may be based on the automated discourse history (as described in 2.2). Accordingly, in some preferred embodiments, the conversation willingness score of a candidate agent may represent how the current conversation of the automated discourse (e.g., the queries and responses) may influence the willingness of the candidate agent to respond. For instance, the conversation willingness may be dynamically adjusted based on a discourse history using a reinforcement learning model.

Additionally, in some preferred embodiments, the conversation willingness score of a candidate agent may be based on the traits and characteristics represented by one or more persona variable values of the virtual persona of the candidate agent. In various embodiments, persona variable values that may influence the persona willingness score of a virtual persona may include, but are not limited to, persona variable values for introversion/extraversion, openness, and/ or any other persona variable values that may relate to the willingness of a virtual persona to participate in a conversation.

In some embodiments, S230 may include implementing a conversation willingness model that may function to compute or output one or more conversation willingness scores for one or more corresponding candidate agents. In one or more embodiments, the conversation willingness model may include one or more machine-learning models, and/or one or more ensembles of machine-learning models. In some preferred embodiments, the conversation willingness model may include a machine learning model (e.g., a large language model (LLM)) or the like, or an ensemble of models, that may receive input and/or produce output in a natural language format. In some embodiments, the conversation willingness model may be provided the automated discourse history and one or more distinct virtual personas of one or more respective distinct candidate agents as input, and in turn the persona willingness model may function to compute or output a conversation willingness score for each candidate agent.

Unified Willingness Scores

Preferably, S230 may include computing a unified willingness score (sometimes referred to herein as an "excitement score") for each of the one or more candidate virtual agents. In various embodiments, a unified willingness score may refer to a value (e.g., a numerical value) that may represent a modulation or combination of the persona willingness score of the corresponding virtual persona of a candidate agent and the conversation willingness score of the candidate agent. Accordingly, in one or more embodiments, S230 may include computing the unified willingness score for a candidate agent based on both the persona willingness score of the corresponding virtual persona of a candidate agent and the conversation willingness score of the candidate agent.

In some preferred embodiments, S230 may function to compute or calculate the unified willingness score for each of the one or more candidate virtual agents based on a unified willingness score equation. In some embodiments, a unified willingness score for a candidate virtual agent may be calculated as:

$$S_{unified} = \frac{S_{persona\_willingness}}{e^{-\alpha(s_{conversation\_willingess} - s_{persona\_willingness})}},$$

where $S_{unified}$ may represent the unified willingness score of the candidate agent, $S_{persona\_willingness}$ may represent the persona willingness score of the virtual persona of the candidate agent, $S_{conversation\_willingness}$ may represent the conversation willingness score of the candidate agent, and α may represent a smoothing parameter that may adjust a smoothing level between the persona willingness score and the conversation willingness score.

Persona Engagement Policy

The use of the unified willingness score, the persona willingness score, and conversation willingness score in selecting responding virtual agents may be referred to as a persona engagement policy (e.g., a willingness policy). The persona engagement policy may address the challenge of simulating realistic human-like interactions by enabling virtual personas (e.g., artificial personas) to make contextually appropriate decisions about when to participate in ongoing conversations. The engagement policy framework may balance each persona's inherent traits with the evolving conversational context to determine participation likelihood, resulting in group dynamics that closely simulate human behavior.

The persona engagement policy may act as a decision-making system that determines whether a virtual persona would choose to speak up in a conversation at a given moment. This capability is distinct from other language model applications, which may respond to every prompt without consideration of whether their participation is contextually appropriate. The techniques described herein may enable simulation of human-like decision-making processes in social contexts. By considering both global conversation relevance and individual persona characteristics, the system may create realistic patterns of engagement across diverse artificial participants (e.g., virtual personas).

The techniques herein may describe enhancements to the persona engagement policy (e.g., enhanced management of LLM inferencing, enhanced deployment and testing framework, enhanced prompting strategy). These enhancements may result in improvements in technical implementation and behavioral realism. Such enhancements may result in a more efficient, scalable, and reliable system for simulating human-like decision making in conversation contexts. These improvements may directly enhance realism and scalability of the system's applications, including focus group simulation and survey response generation. By enabling patterns of engagement that more closely simulate human-like behavior and more efficient processing of persona communities, the enhanced policy may contribute to creating realistic, diverse, and internally consistent virtual personas. The techniques described herein may support integration of reinforcement learning approaches. For instance, by combining rule-based and supervised learning approaches with reinforcement learning techniques, more adaptive and context-aware decision-making capabilities may generalize across diverse conversation scenarios and persona communities.

Enhanced Management of LLM Inferencing

The techniques described herein may enable improved management of LLM inferences (e.g., via architecture enhancements). For instance, the techniques herein may include using a deployment solution for language models that enhances how a model processes requests and generates responses (e.g., Structured Generation Language (SG-Lang)). Such deployment solutions may have improved performance over other deployment solutions (e.g., virtual large language model (vLLM)).

For instance, S230 may use a handler (e.g., an SGLang handler) capable of performing batch processing such that multiple personas may be evaluated simultaneously. For instance, a first request may be tested separately and, upon success, remaining requests may be processed in batches, reducing API calls and processing overhead compared to other approaches involving performing processing for each agent's persona. Performing processing in batches may benefit scenarios in which multiple agents are employed, whereas sequential evaluation processes may result in bottlenecks with limited scalability. Additionally, or alternatively, the framework associated with the solution deployment may generate a discrete number of responses (e.g., binary responses), enabling simplified post-processing (e.g., as compared to more complex post-processing on unconstrained outputs).

The handler employed by S230 may, in some examples, extract normalized log probabilities for each response generated by an agent (e.g., by a virtual persona), which may enable agent decisions to be ranked by confidence scores.

Such confidence scores may enable a more nuanced ranking as compared to scores with binary values. In examples in which prompts share common elements, Key-Value (KV) caching may be performed to optimize inference performance, which may reduce redundant computations across similar contexts.

Figure 8:
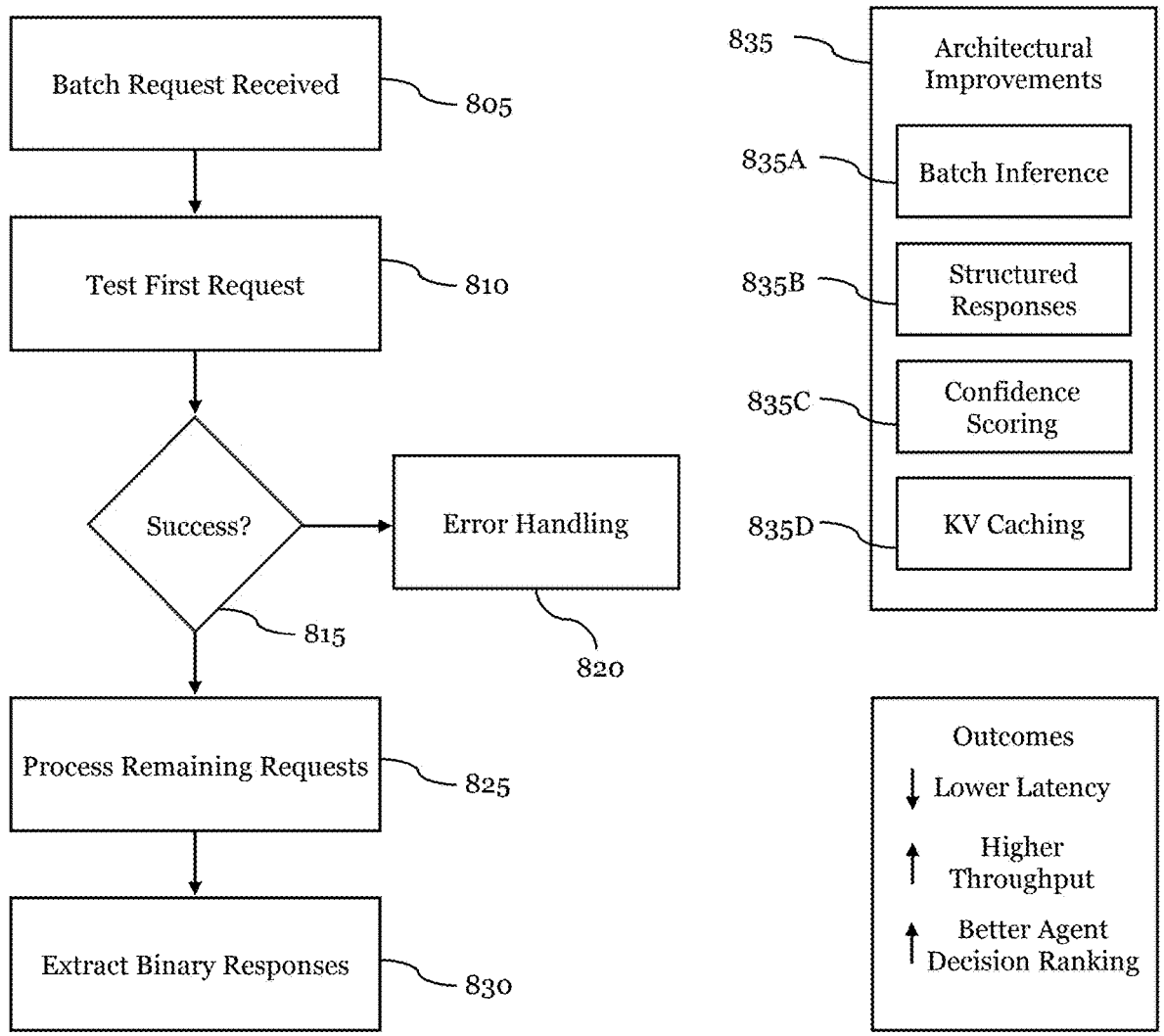
FIG. 8 illustrates a schematic representation of batch processing of virtual agents in accordance with one or more embodiments of the present application

In a non-limiting example of performing batch processing, as described with reference to FIG. 8, a batch request may be received at 805 (e.g., by response generation engine 183). The batch processing may include the process of identifying responding virtual agents (e.g., calculation and ranking of willingness scores) and/or identifying candidate virtual agents. A first request may be processed at 810 (e.g., processing may be performed for a single virtual persona) and, if successful, the remaining requests may be processed in batches at 825 (e.g., using KV caching optimization). Additionally, binary responses (e.g., yes or no) with confidence scores may be extracted at 830. If processing the first request fails at 810, error handling may be performed (e.g., an error may be returned for all requests). This procedure may be supported by architecture improvements 835, including batch inference 835A (e.g., processing multiple personas in parallel), structured responses 835B (e.g., a binary yes/no with constraints), confidence scoring 835C (e.g., using normalized log probabilities), and KV caching 835D (e.g., reusing computation across requests).

Such enhancements may result in improved inference latency, throughput, and reliability. For instance, reduced latency may occur (e.g., decreasing from 7-9 seconds using vLLM to 3-5 seconds using SGLang under test loads to 20 concurrent responses on an amazon web service (AWS) Amazon Elastic Compute Cloud (EC2) t2.2xLarge instance). Additionally, increased throughput may occur (e.g., the batch processing capability may enable handling up to 3× more concurrent requests without proportional increases in processing time, enabling improved overall system throughput). Further, the enhanced system may have more consistent performance under varying load conditions (e.g., fewer timeout and rate limit errors during peak usage periods). Such enhancements may enable a system performing the techniques described herein (e.g., system 100) to handle larger communities and more complex (e.g., larger) conversations while maintaining responsive interaction patterns.

Enhanced Prompting Strategy

The techniques described herein may use an enhanced prompting strategy to elicit decision-making behavior from one or more LLMs. For instance, the prompts provided to the LLM may focus on demographic and psychographic attributes instead of specific persona attributes, thus reducing a likelihood of focusing on superficial identity elements. Additionally, prompts to the LLM may explicitly constrain responses to binary "yes" or "no" answers, thus reducing post-processing of outputs, which may otherwise be unconstrained. Further, the system described herein may perform truncation of conversation history when it exceeds the model's context window, preserving information associated with recent exchanges while maintaining overall conversation coherence. Modifying the prompts in the manner described herein may enhance the reliability of the persona engagement policy (e.g., willingness score, excitement score).

Identifying Responding Agents

In some preferred embodiments, S230 may select or identify the one or more responding virtual agents based on identifying one or more candidate virtual agents with corresponding unified willingness scores that may be within a unified willingness score threshold. For instance, S230 may select a subset of responding virtual agents by applying a predefined willingness score threshold. In various embodiments, a unified willingness score threshold may refer to a predefined unified willingness score value (e.g., a numerical value) that may define a differentiation between candidate agents that may have a sufficient willingness or readiness to participate in the automated discourse at a current timestep and candidate agents that may not have a sufficient willingness or readiness to participate in the automated discourse at the current timestep. In some embodiments, candidate agents with a unified willingness score value equal to or above the unified willingness score threshold may be identified or selected as willing candidate agents (i.e., willing to participate in the automated discourse), and candidate agents with a unified willingness score value below the unified willingness score threshold may be identified as unwilling candidate agents (i.e., unwilling to participate in the automated discourse). It shall be noted that one or more identified unwilling candidate agents may be unwilling to participate in the automated discourse at a current timestep but may be identified as willing candidate agents in one or more other (e.g., previous or subsequent) timestep based on the unified willingness score of the candidate agent computed during the one or more other (e.g., previous or subsequent) timesteps.

As a non-limiting example, S230 may function to compute unified willingness scores for three candidate agents A, B, and C. In such an example, candidate agent A may have a corresponding unified willingness score of 0.67, candidate agent B may have a corresponding unified willingness score of 0.43, and candidate agent C may have a corresponding unified willingness score of 0.81. In such an example, a unified willingness score threshold may be predefined or set to 0.55, such that candidate agents A and C may be identified and selected as willing candidate agents (i.e., willing to participate in the automated discourse at the current timestep) and candidate agent B may be identified as an unwilling candidate agent. It shall be noted that the above example is non-limiting, and the unified willingness score threshold may be set to any other suitable value in the range of unified willingness scores.

In some preferred embodiments, a maximum number m of responding agents may be selected from the set of identified willing candidate agents. In some such embodiments, the number m may be randomly generated at every timestep of the automated discourse. In one or more embodiments, at every timestep of the automated discourse, the number m may be randomly sampled from a distribution. As a non-limiting example, the number m may be sampled from a normal distribution with a mean of 3. It shall be noted that the above example is non-limiting, and the number m may be computed or determined based on another distribution and/or another mean value, and/or may be otherwise randomly determined.

Figure 7:
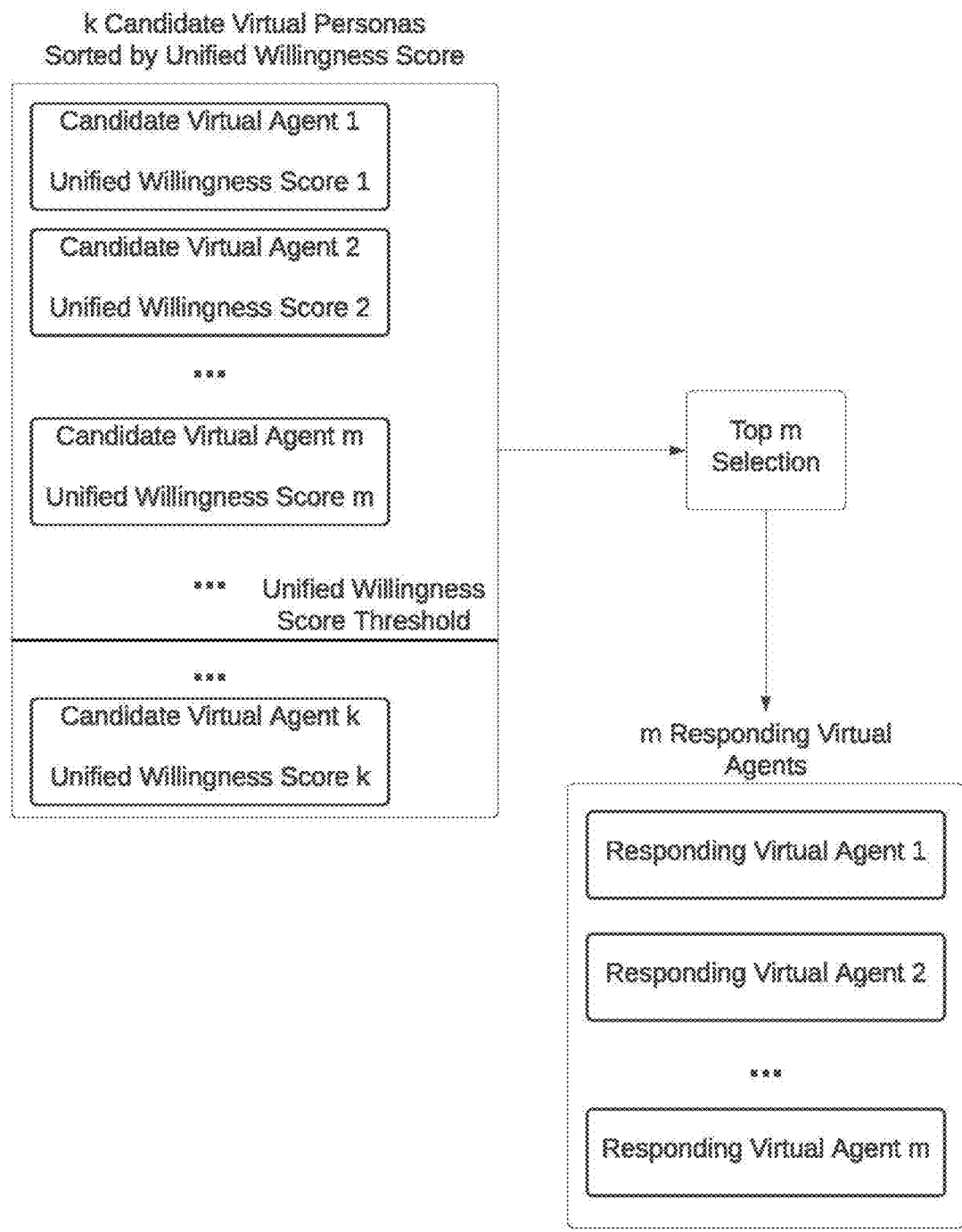
FIG. 7 illustrates a schematic representation of identifying responding virtual agents in accordance with one or more embodiments of the present application.

In some preferred embodiments, the top m willing candidate agents, that is the candidate agents with the highest unified willingness scores, may be identified and/or selected as responding virtual agents, as shown by way of example in FIG. 7. In such embodiments, selecting only the top m willing candidate agents may preferably prevent the one or more users and/or the automated discourse from being excessively burdened or overwhelmed if a large number of willing candidate virtual agents are identified. Alternatively, in some embodiments, S230 may function to identify and/or select each willing candidate agent (i.e., each candidate virtual agent with a corresponding unified willingness score equal to or above the unified willingness score threshold) as a responding virtual agent.

2.4 Surfacing One or More Responses from the One or More Responding Virtual Agents S240, which includes surfacing one or more responses from the one or more responding virtual agents, may function to surface one or more generated responses from each of the one or more responding virtual agents. For instance, S240 may selectively instantiate (e.g., by a batch processing framework executed within the API-based application as described herein), an engagement subset of personas (e.g., responding personas) of a selected subset of personas (e.g., a subset of candidate personas) based on selecting to the engagement subset of personas multiple candidate personas of the subset of personas having a given discourse activation value exceeding or satisfying persona launching conditions. For instance, S240 may execute a computer simulation environment that automates a simulated discourse session between the computer-simulated personas of the engagement subset of personas and generates a corpus of synthetic discourse data based on recording, to a computer memory, discourse data observed during the simulated discourse session between the computer-simulated personas of the engagement subset of personas. S240 may further selectively transmit from the computer memory, via an API response of the API-based application, at least a part of the corpus of synthetic discourse data to an interactive GUI of the client device based on receiving an input command signal from a user selected.

Generating the corpus of synthetic discourse data may include generating, using a transformer-based language model running in an asynchronous inference service, discourse data for each computer-simulated persona of the engagement subset of personas, where a discourse data generation module of the discourse service processes the discourse input data and the historical discourse data using a fine-tuned transformer model adapted to persona attributes that ensures coherence of the discourse data generated during the simulated discourse session with prior discourse interactions. Additionally, executing the computer simulation environment may include executing a reinforcement learning-driven discourse generation model that is implemented using a persona behavior policy optimization that, when executed, dynamically updates the discourse activation values of each computer-simulated persona of the engagement subset based on historical discourse engagement metrics. In some examples, executing the computer simulation environment to automate the simulated discourse session comprises dynamically adjusting persona participation behavior using a multi-agent reinforcement learning framework, where each computer-simulated persona of the engagement subset independently learns an optimal engagement policy by iterating over past discourse interactions and reward signals In some examples, executing the API-based application includes performing batch processing for persona selection and engagement activation, where the multiple computer-simulated personas are evaluated simultaneously using the batch inference framework, reducing API latency and computational overhead. In some examples, the corpus of synthetic discourse data generated during the simulated discourse session may be stored in a database system implementing approximate nearest neighbor (ANN) indexing for efficient retrieval, where prior simulated discourse sessions are referenced to inform future persona participation decisions.

In various embodiments, S240 may include generating, for each identified responding virtual agent (e.g., by a response generation module, such as response generation engine 183), one or more responses based on a current state of the automated discourse. The response generation module may process the user input and discourse history using a transformer-based language model (e.g., an agent response generation model as described herein) trained to adapt responses based on persona attributes and ensures response coherence with prior discourse interactions. In one or more embodiments, S240 may function to surface the one or more responses to one or more users via the automated discourse user interface (e.g., transmitting the generated responses to a graphical user interface for display to a user). Additionally, in some embodiments, S240 may include updating the automated discourse history with the one or more generated responses.

In some embodiments, the one or more responses from the one or more responding virtual agents may be generated or output from an agent response generation model. An agent response generation model, as generally referred to herein, may relate to a machine learning model, or an ensemble of machine learning models, that may function to output a virtual agent response based on the virtual agent and contextual data about the current state of the automated discourse. In one or more embodiments, the agent response model may include one or more large language models (LLMs). In one or more embodiments, the agent response model may function to receive, process, and output one or more natural language utterances.

In some embodiments, the agent response generation model may receive, as input, a virtual persona artifact corresponding to the virtual persona of a distinct responding virtual agent, as well as automated discourse contextual data, and in turn the agent response generation model may output a response of the distinct virtual agent in the automated discourse. Accordingly, for each distinct identified responding virtual agent, S240 may function to input the virtual persona of the distinct identified responding virtual agent and automated discourse contextual data into the agent response generation model, and the agent response generation model may in turn output a response for the distinct identified responding virtual agent. In some embodiments, the input automated discourse contextual data may include one or more (or all) previous responses and user input queries (e.g., moderator queries) of the automated discourse. Additionally, or alternatively, in some embodiments, the input automated discourse contextual data may include the automated discourse history and/or the automated discourse digest. Preferably, the output of the agent response generation model may include or be formatted as a natural language response or natural language utterance (e.g., a string or textual utterance).

In one or more embodiments, S240 may function to surface each generated response of each responding virtual agent to one or more users. In some embodiments, S240 may function to output the one or more responses of the responding virtual agents via the automated discourse user interface. In some such embodiments, the one or more responses of the responding virtual agents may be output to and/or displayed in an automated discourse text object that may include a text box, text field, text area, and/or any other suitable text display user interface object or control. In some embodiments, for each distinct responding virtual agent, S240 may function to output the virtual agent identifier of the distinct responding virtual agent and the generated response of the distinct responding virtual agent, such that one or more users may identify the virtual agent associated with each generated response.

In some embodiments, S240 may include updating the automated discourse history and/or the automated discourse digest. In some such embodiments, S240 may function to append or otherwise add the current moderator query or utterance to the automated discourse history. Additionally, in some such embodiments, S240 may include adding each generated response to the automated discourse history and/or the automated discourse digest. In such embodiments, once each identified responding agent has generated a response, S240 may function to append each generated responding virtual agent response and the agent identifier of the corresponding responding virtual agent to the automated discourse history and/or the automated discourse digest.

Enhanced Deployment and Testing Framework

The techniques described herein may utilize a set of tools and processes that provide for continuous integration and deployment (CI/CD) and improve reliability. Such tools and processes may automate the process of testing and deploying software updates to ensure consistent quality and reduce manual intervention.

Such tools and processes may include automated health checks that verify endpoint health before deployment (e.g., created in a scripting language). The scripts executing these automated health checks may implement monitoring loops that query worker status and wait until at least one worker is ready, raising custom timeout exceptions in scenarios in which timeout occurs. Additionally, or alternatively, such tools and processes may include streamlined deployment scripts that leverage mutations in a query language (e.g., GraphQL) to update endpoint templates and save serverless templates on a cloud platform (e.g., Runpod). This automation may reduce manual intervention and one or more errors in the deployment process.

The tools and processes may further include a regression testing framework that includes predefined conversation stacks with expected responding and non-responding agents, where such tools may ensure that new changes do not interfere with existing functionality. The regression testing framework may automatically validate API responses, agent selection accuracy, and performance metrics (e.g., latency, precision, recall, accuracy) after each deployment. The tools and processes may additionally include GitHub Actions integration that orchestrates a portion or all of the CI/CD pipeline (e.g., building Docker images, deploying to development, staging, and/or production environments). Workflows associated with GitHub actions may include automated testing and provide feedback on pull requests to track performance changes. The enhanced testing and deployment framework described herein may ensure that each update to the persona engagement policy (e.g., willingness scores, excitement scores) maintains or improves accuracy before deployment to production environments, preventing silent failures, automating quality control, and enhancing the reliability of the system.

In some examples, using regression testing may enable an improvement (e.g., a 12% improvement) in consistency of decisions for identical personas across multiple evaluations, indicating more reliability behavior, where decision consistency may refer to how often the system makes the same decision when presented with the same scenario multiple times. Further, it should be noted that a system using the persona engagement policy may demonstrate improved precision in identifying personas with relevant experience and expertise to participate in specific conversation topics. For instance, the persona engagement policy described herein may result in an average relevance score of 5.3 compared to 5.0 in other implementations (e.g., implementations in which no persona engagement policy is used) on a scale of 1 to 7. Precision may refer to how accurately the system selects personas that are truly relevant to a conversation. Enhanced recall metrics may indicate that a system is more effective at identifying all relevant personas for a given conversation topic, reducing the likelihood of excluding qualified participants. Recall measures a system's ability to find all relevant personas. The accuracy improvements described herein may result in more realistic and appropriate engagement patterns across diverse conversation scenarios.

Applications of Responding Virtual Agents

The responses generated by responding virtual agents may be used in a variety of applications (e.g., for simulating realistic human behavior). One such application may include focus group discussions, in which participants provide insight on a particular topic based on their interest and relevance to the topic. The enhancements to management of LLM inferencing (e.g., to architecture improvements) may enable the system to handle a larger community of personas with reduced latency, allowing for more diverse participant pools within a simulated focus group (e.g., and thus improved scalability). The refined prompting strategy and batch processing capabilities may result in patterns of engagement more similar to that of human participants, where personas may participate based on their inherent traits and the evolving conversation context. The enhanced testing framework described herein may ensure that the policy maintains consistent behavior across deployments, preventing or mitigating unexpected shifts in persona behavior that may compromise realism of simulated discussions. Further, a quantity of personas may be selected (e.g., manually or corresponding to a metric that is optimized by the quantity of personas). For instance, 8 to 10 personas may be selected for each focus group. Using the engagement policy for persona selection may produce more contextually relevant responses as compared to a random sampling approach (e.g., select virtual personas at random to respond).

An additional application may include survey response generation. For instance, the policy may be used to select the n most relevant and excited personas (e.g., according to an excitement metric) to complete a survey, where n is a fixed number determined by survey constraints, ensuring that only personas with relevant characteristics participate. Additionally, the techniques described herein may filter for the most engaged personas based on their demographic and psychographic attributes, enabling improved survey response quality. Further, the techniques may enable efficient resource utilization via pre-selection of the most relevant personas before generating survey responses by focusing only on the most appropriate candidates (e.g., not all possible candidates). These applications may enable more realistic survey simulations (e.g., more like survey simulations performed with human participants).

3.00 Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A computer-implemented method for generating automated discourse data using computer-generated synthetic personas, the method comprising:
at a synthetic discourse data service (discourse service) implemented at least in part by an application programming interface (API)-based application executed by one or more computers of a distributed network of computers:
receiving, via an API endpoint of the API-based application, discourse input data from a client device, the discourse input data comprising a natural language utterance;
generating, using an embedding generation model executed on a graphical processing unit (GPU)-accelerated computing environment, an embedding vector representation of the discourse input data;
identifying, by the one or more computers executing the API-based application, a set of candidate computer-simulated personas by retrieving persona data from a vector database, wherein each computer-simulated persona of the set is associated with a distinct persona dataset stored in a persona data repository;
extracting, in real-time, a subset of personas from the set of candidate computer-simulated personas based on computing a persona relevance for each candidate persona of the set of candidate computer-simulated personas, wherein the extracting includes:
computing in real-time, by the one or more computers executing the API-based application, a vector distance between the vector representation of the discourse input data and a persona vector representation associated with each computer-simulated persona of the set of candidate computero-simulated personas, and
dynamically selecting the subset of personas based on identifying candidate personas having a vector distance that satisfies or does not exceed a maximum vector distance threshold;
computing, by the one or more computers executing the API-based application, a discourse activation value for each of candidate persona of the subset of personas, wherein the discourse activation value indicates a degree of interest of a given computer-simulated persona in engaging in a given virtual discourse associated with the discourse input data;
selectively instantiating, by a batch processing framework executed within the API-based application, an engagement subset of personas of the subset of personas based on selecting to the engagement subset of personas multiple candidate personas of the subset of personas having a given discourse activation value satisfying or exceeding persona launching conditions;
executing a computer simulation environment that:
automates a simulated discourse session between the computer-simulated personas of the engagement subset of personas, and
generates a corpus of synthetic discourse data based on recording to a computer memory discourse data observed during the simulated discourse session between the computer-simulated personas of the engagement subset of personas;
selectively transmitting from the computer memory, via an API response of the API-based application, at least a part of the corpus of synthetic discourse data to an interactive graphical user interface (GUI) of the client device based on receiving an input command signal from a user selected GUI object requesting the part of the corpus of synthetic discourse data.

2. The method according to claim 1, wherein generating the corpus of synthetic discourse data includes:
generating, using a transformer-based language model running in an asynchronous inference service, discourse data for each computer-simulated persona of the engagement subset of personas, wherein a discourse data generation module of the discourse service processes the discourse input data and the historical discourse data using a fine-tuned transformer model adapted to persona attributes that ensures coherence of the discourse data generated during the simulated discourse session with prior discourse interactions.

3. The method according to claim 1, wherein executing the computer simulation environment includes executing a reinforcement learning-driven discourse generation model that is implemented using a persona behavior policy optimization that, when executed, dynamically updates the discourse activation values of each computer-simulated persona of the engagement subset based on historical discourse engagement metrics.

4. The method according to claim 1, further comprising:
processing, by the one or more computers executing the API-based application, the discourse input data, wherein the processing includes:
extracting contextual data from the discourse input data, and
using a client identifier associated with the client device to retrieve from a computer database historical discourse data.

5. The method according to claim 4, wherein the embedding vector representation of the discourse input data encodes semantic and conversation features based on the historical discourse data.

6. The method according to claim 1, further comprising:
generating, using the embedding generation model, a persona embedding vector for each computer-simulated persona based on persona attributes stored within a given persona dataset associated with each respective computer-simulated persona.

7. The method according to claim 1, wherein executing the API-based application comprises performing batch processing for persona selection and engagement activation, wherein the multiple computer-simulated personas are evaluated simultaneously using the batch inference framework, reducing API latency and computational overhead.

8. The method according to claim 1, wherein computing the discourse activation value for each candidate persona further comprises generating a confidence score based on normalized log probabilities of a participation decision of a given candidate persona, wherein the confidence score is used to rank each candidate persona and dynamically adjust a likelihood of each candidate persona being selected for engagement in the simulated discourse session.

9. The method according to claim 1, wherein retrieving persona data from a vector database further comprises implementing a shared key-value (KV) caching mechanism that optimizes inference performance by storing common persona-query responses and reducing redundant computations across similar persona selection requests.

10. The method according to claim 1, wherein identifying candidate personas from the persona data repository comprises performing a k-nearest neighbors (k-NN) filtering operation to generate an initial ranked list of personas based on their vector similarity to the discourse input data, wherein personas that exceed a predefined similarity threshold are prioritized for engagement consideration.

11. The method according to claim 1, wherein computing the discourse activation value for each candidate persona further comprises generating an excitement score by combining a persona-specific willingness score computed based on intrinsic attributes of a given candidate persona with a conversation-based willingness score computed based on the intrinsic attributes of the given candidate persona together with attributes of the historical discourse data, wherein the excitement score modulates persona participation likelihood using an exponential smoothing function.

12. The method according to claim 1, wherein the corpus of synthetic discourse data generated during the simulated discourse session is stored in a database system implementing approximate nearest neighbor (ANN) indexing for efficient retrieval, wherein prior simulated discourse sessions are referenced to inform future persona participation decisions.

13. The method according to claim 1, wherein retrieving persona data from the vector database further comprises performing context-aware truncation of the historical discourse data when a history length of the historical discourse data exceeds a predefined context window, wherein recent-in-time and semantically relevant discourse data are retained for persona selection and synthetic discourse data generation.

14. The method according to claim 1, wherein executing the computer simulation environment to automate the simulated discourse session comprises dynamically adjusting persona participation behavior using a multi-agent reinforcement learning framework, wherein each computer-simulated persona of the engagement subset independently learns an optimal engagement policy by iterating over past discourse interactions and reward signals.

15. A method comprising:
at a synthetic discourse data service (discourse service) implemented as a microservices-based, application programming interface (API) application deployed on a cloud computing infrastructure and executed by one or more processors in a distributed computing environment:
receiving, via an API endpoint of the microservices-based API-based application, discourse input data from a client device, the discourse input data comprising a natural language utterance;
generating, using an embedding generation model executed on a graphical processing unit (GPU)-accelerated computing environment, an embedding vector representation of the discourse input data;
identifying, by the one or more computers executing the microservices-based API-based application, a set of candidate computer-simulated personas by retrieving persona data from a vector database implementing approximate nearest neighbor (ANN) search, wherein each computer-simulated persona of the set is associated with a distinct persona dataset stored in a persona data repository;
extracting, in real-time, a subset of personas from the set of candidate computer-simulated personas based on computing a cosine similarity score between the embedding vector representation of the discourse input data and a persona embedding vector representation associated with each computer-simulated persona of the set of candidate computer-simulated personas, and dynamically selecting the subset of personas based on identifying candidate personas having a similarity score that satisfies or does not exceed a maximum vector distance threshold;
computing, by the one or more computers executing the microservices-based API-based application, a discourse activation value for each candidate persona of the subset of personas, wherein the discourse activation value indicates a degree of interest of a given computer-simulated persona in engaging in a given virtual discourse associated with the discourse input data;
selectively instantiating, by a batch processing framework executed within the microservices-based API-based application, an engagement subset of personas of the subset of personas based on selecting to the engagement subset of personas multiple candidate personas of the subset of personas having a given discourse activation value satisfying or exceeding persona launching conditions;
executing a reinforcement learning-driven discourse generation model that:
automates a simulated discourse session between the computer-simulated personas of the engagement subset of personas, and generates a corpus of synthetic discourse data based on recording to a computer memory discourse data observed during the simulated discourse session between the computer-simulated personas of the engagement subset of personas;
selectively transmitting, via an event-driven API response within the microservices-based API-based application, at least a part of the corpus of synthetic discourse data to an interactive graphical user interface (GUI) of the client device, wherein data transmission is optimized using WebSocket streaming or RESTful API communication, based on receiving an input command signal from a user-selected GUI object requesting the part of the corpus of synthetic discourse data.

16. The method according to claim 15, wherein generating the corpus of synthetic discourse data includes:

generating, using a transformer-based language model running in an asynchronous inference service, discourse data for each computer-simulated persona of the engagement subset of personas, wherein a discourse data generation module of the discourse service processes the discourse input data and the historical discourse data using a fine-tuned transformer model adapted to persona attributes that ensures coherence of the discourse data generated during the simulated discourse session with prior discourse interactions.

17. The method according to claim 15, wherein executing the computer simulation environment includes executing a reinforcement learning-driven discourse generation model that is implemented using a persona behavior policy optimization that, when executed, dynamically updates the discourse activation values of each computer-simulated persona of the engagement subset based on historical discourse engagement metrics.

18. A system for generating automated discourse data using computer-generated synthetic personas, the system comprising:

a distributed computing network comprising one or more computers executing an application programming interface (API)-based application implementing a synthetic discourse data service;

one or more processors configured to execute the API-based application and perform operations including:

a communication interface that:

receives, via an API endpoint of the API-based application, discourse input data from a client device, the discourse input data comprising a natural language utterance;

transmits at least a part of a corpus of synthetic discourse data to an interactive graphical user interface (GUI) of the client device via an API response, wherein the corpus of synthetic discourse data is selectively retrieved from a computer memory based on receiving an input command signal from a user-selected GUI object requesting the part of the corpus of synthetic discourse data;

a graphics processing unit (GPU)-accelerated embedding generation module that:

generates an embedding vector representation of the discourse input data;

a persona selection module comprising a vector database storing persona datasets, wherein each computer-simulated persona of a set of candidate computer-simulated personas is associated with a distinct persona dataset stored in a persona data repository, the persona selection module that:

retrieves persona data from the vector database;

computes in real-time a persona relevance for each candidate persona based on computing a vector distance between the embedding vector representation of the discourse input data and a persona vector representation associated with each computer-simulated persona;

dynamically selects a subset of personas based on identifying candidate personas having a vector distance that satisfies or does not exceed a maximum vector distance threshold;

a discourse activation module that:

computes a discourse activation value for each candidate persona of the subset of personas, wherein the discourse activation value indicates a degree of interest of a given computer-simulated persona in engaging in a virtual discourse associated with the discourse input data;

a batch processing framework that:

selectively instantiates an engagement subset of personas from the subset of personas based on selecting multiple candidate personas having a discourse activation value satisfying or exceeding persona launching conditions;

a simulated discourse generation module that:

executes a computer simulation environment that automates a simulated discourse session between the computer-simulated personas of the engagement subset of personas; and generates the corpus of synthetic discourse data based on recording to the computer memory discourse data observed during the simulated discourse session between the computer-simulated personas of the engagement subset of personas.

19. The system according to claim 18, wherein generating the corpus of synthetic discourse data includes:

generating, using a transformer-based language model running in an asynchronous inference service, discourse data for each computer-simulated persona of the engagement subset of personas, wherein a discourse data generation module of the discourse service processes the discourse input data and the historical discourse data using a fine-tuned transformer model adapted to persona attributes that ensures coherence of the discourse data generated during the simulated discourse session with prior discourse interactions.

20. The system according to claim 18, wherein executing the computer simulation environment includes executing a reinforcement learning-driven discourse generation model that is implemented using a persona behavior policy optimization that, when executed, dynamically updates the discourse activation values of each computer-simulated persona of the engagement subset based on historical discourse engagement metrics.

* * * * *